(12) United States Patent
Harrison et al.

(10) Patent No.: US 7,568,943 B2
(45) Date of Patent: Aug. 4, 2009

(54) SEALING AND RETAINING CABLE ATTACHMENT FOR TELECOMMUNICATIONS CLOSURES

(75) Inventors: C. Randall Harrison, Decatur, TX (US); Chois A. Blackwell, Jr., North Richland Hills, TX (US); Donnie R. Clapp, Jr., Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/493,733

(22) Filed: Jul. 26, 2006

(65) Prior Publication Data

US 2007/0036488 A1 Feb. 15, 2007

Related U.S. Application Data

(60) Provisional application No. 60/702,965, filed on Jul. 27, 2005.

(51) Int. Cl.
*H01R 9/05* (2006.01)
(52) U.S. Cl. ....................... 439/578; 439/441
(58) Field of Classification Search ................ 439/578, 439/441; 385/89–95
See application file for complete search history.

(56) References Cited

U.S. PATENT DOCUMENTS

| | | | |
|---|---|---|---|
| 3,584,888 A * | 6/1971 | Lott | 277/589 |
| 4,358,079 A * | 11/1982 | Navarro | 248/56 |
| 4,787,706 A * | 11/1988 | Cannon et al. | 385/59 |
| RE33,611 E * | 6/1991 | Michaels et al. | 439/610 |
| 5,042,901 A * | 8/1991 | Merriken et al. | 385/135 |
| 5,055,056 A * | 10/1991 | Auclair et al. | 439/98 |
| 5,185,844 A * | 2/1993 | Bensel et al. | 385/135 |
| 5,235,138 A * | 8/1993 | Shah et al. | 174/152 G |
| 5,337,385 A * | 8/1994 | Baderschneider et al. | 385/59 |
| 5,378,174 A * | 1/1995 | Brownlie et al. | 439/709 |
| 5,529,522 A * | 6/1996 | Huang | 439/441 |
| 6,548,761 B1 * | 4/2003 | Wang | 174/74 R |

(Continued)

FOREIGN PATENT DOCUMENTS

DE 1196745 B 7/1965

(Continued)

OTHER PUBLICATIONS

International application published under the Patent Cooperation Treaty; International Publication No. WO 2007/014385 A3; Feb. 1, 2007; 4 pages.

(Continued)

*Primary Examiner*—Briggitte Hammond
(74) *Attorney, Agent, or Firm*—John H. Vynalek

(57) ABSTRACT

There is provided a cable attachment for sealing and retaining cables entering an opening of a telecommunications closure. The cable attachment includes an adapter body with an opening through which the cable passes; and a grip device and grommet device are also located within the opening of the adapter body for strain relieving and sealing, respectively, the cable passing through the adapter body. The cable attachment further includes a bolt portion that is selectively moveable relative to the adapter body for applying a force to the grommet device for selectively creating a seal about an outer surface of the cable. Alternative designs for sealing and/or strain relieving cables entering a closure are provided.

17 Claims, 28 Drawing Sheets

U.S. PATENT DOCUMENTS

| | | | |
|---|---|---|---|
| 6,575,474 B1 | 6/2003 | Zimmer et al. | 277/603 |
| 6,579,014 B2 | 6/2003 | Melton et al. | 385/76 |
| 6,625,375 B1 * | 9/2003 | Mahony | 385/135 |
| 6,926,449 B1 | 8/2005 | Keenum et al. | 385/76 |
| 6,962,445 B2 | 11/2005 | Zimmel et al. | 385/55 |
| 7,044,650 B1 | 5/2006 | Tran et al. | 385/76 |
| 2002/0159709 A1 * | 10/2002 | Faus | 385/54 |

FOREIGN PATENT DOCUMENTS

| | | |
|---|---|---|
| DE | 6601559 U | 3/1969 |
| DE | 2934053 B1 | 11/1980 |
| DE | 8116716 U1 | 11/1982 |
| DE | 19738517 C1 | 11/1998 |
| EP | 1536535 A1 | 6/2005 |
| WO | 99/33154 | 7/1999 |

OTHER PUBLICATIONS

Thomas & Betts product information sheet, http://www-public.tnb.com/aus/docs/Nicote_p1.pdf, Non-Metallic Cable Glands; admitted art.

* cited by examiner

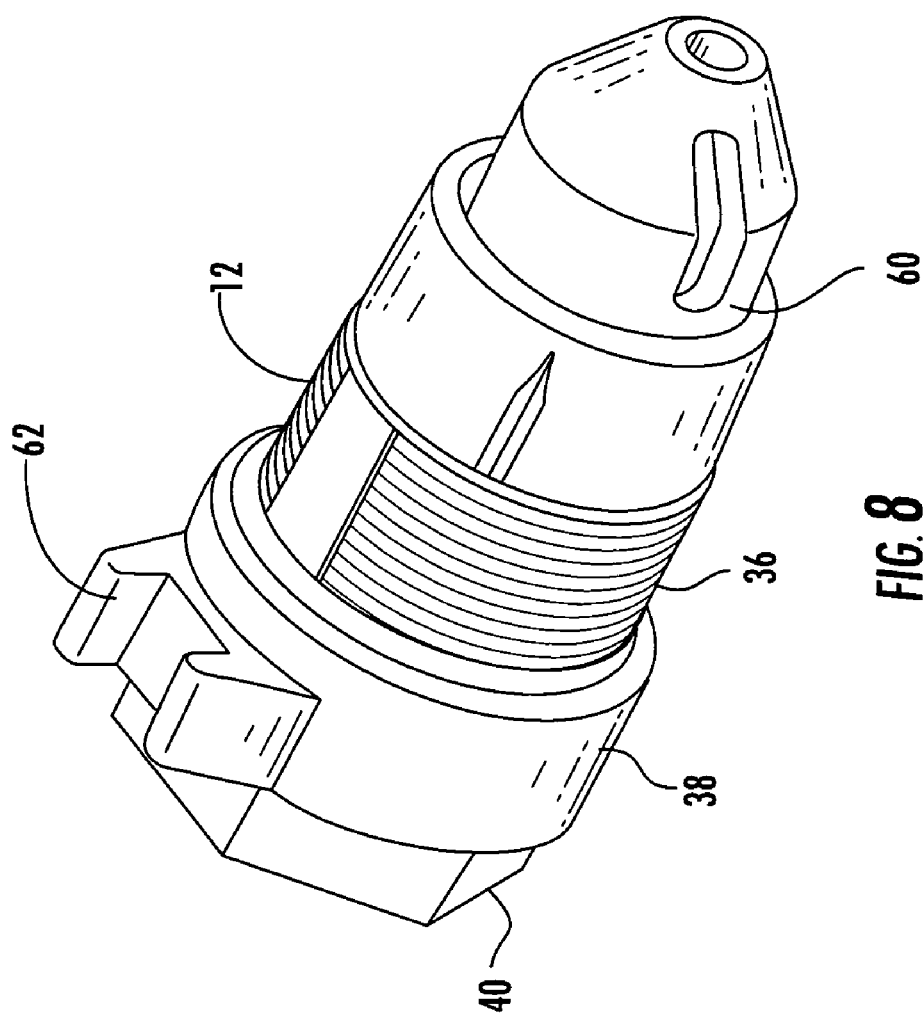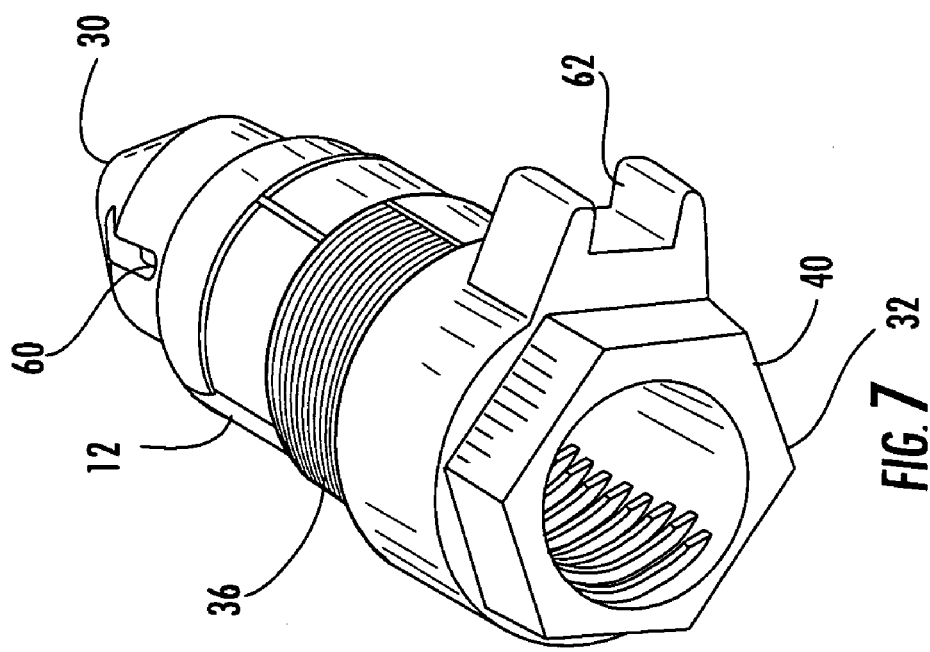

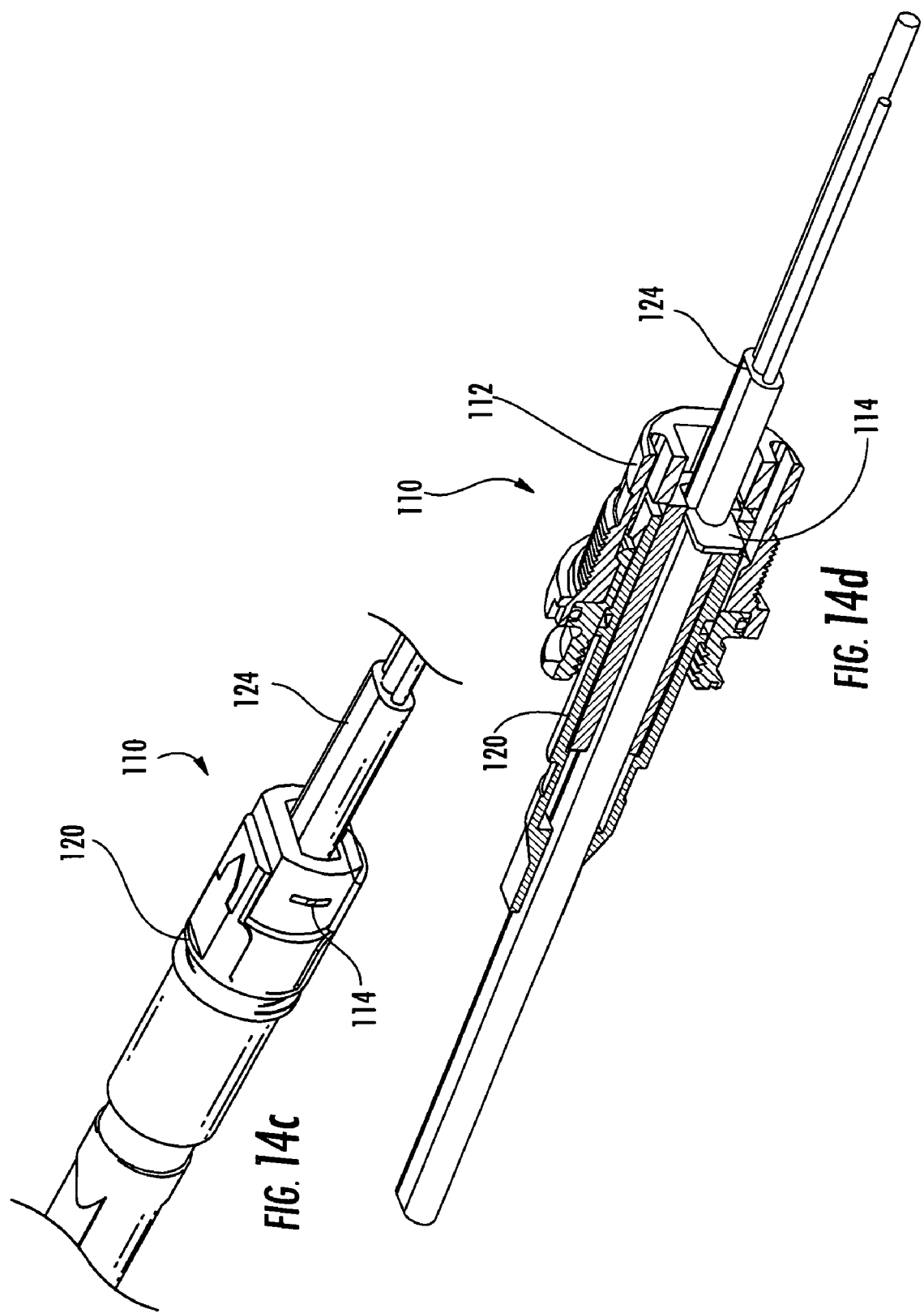

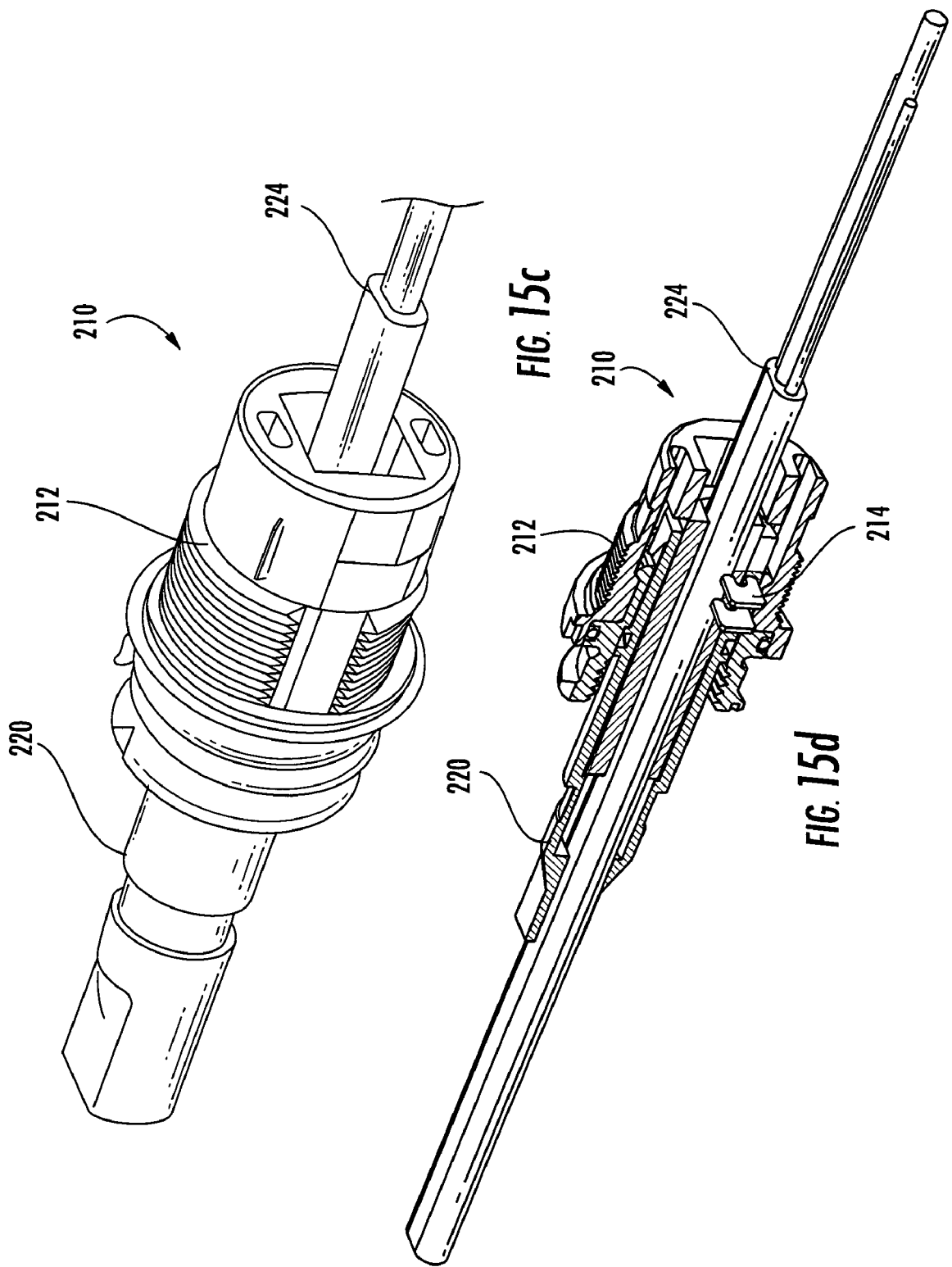

SEALING AND RETAINING CABLE ATTACHMENT FOR TELECOMMUNICATIONS CLOSURES

CROSS REFERENCE TO RELATED APPLICATION

The present application claims priority pursuant to 35 U.S.C. 119(e) to U.S. Provisional Application Ser. No. 60/702,965, entitled "Optisheath Cable Add Kit" and filed Jul. 27, 2005.

BACKGROUND OF THE INVENTION

1. Field of the Invention

The present invention is related to telecommunications closures, and more particularly, to apparatus and methods for inserting at least one cable into a telecommunication closure.

2. Description of Related Art

Telecommunications closures for housing communications equipment are deployed at various points along the distribution network. Telecommunications closures are positioned at various locations such as aerially from a utility pole, above ground on a pedestal, or below ground in a below grade closure. One example of a telecommunications closure is a splice closure configured to be positioned below ground. Conventional splice closures include components such as splice trays and/or slack hubs to facilitate the splicing of one or more fiber optic cables. Such splice closures are preferably watertight to prevent any degradation of the fibers and/or splices due to the ingress of water and other elements.

Telecommunications closures typically include one or more openings defined in the closure to allow the cables, which are connected, stored, and/or otherwise present within the closure, to enter and exit the closure. Preferably, the closure provides a generally sealed environment to protect the connectors, cables, and other hardware stored within the closure from water, dirt, moisture, infestation, or the like. Conventional closures typically include grommets that are interchangeable and that provide a variety of openings through which one or more cables may pass into the closure. To run a cable into a closure, a field technician typically removes a plug device (such as a grommet with no openings), selects a grommet with one or more openings suitable for the cable to pass through, positions the cable through the grommet, and then places the grommet into the opening of the closure. One shortfall of this approach is that the grommet openings may not always be optimally sized to seal the cable. Furthermore, the grommets do not provide any strain relief to the cable entering the closure. Therefore, a need exists for a cable attachment that conveniently seals and retains a cable entering a telecommunications closure.

BRIEF SUMMARY OF THE INVENTION

The invention addresses the above needs and achieves other advantages by providing a cable attachment that seals and retains a cable entering a telecommunications closure through an opening defined in the closure. The cable attachment of the present invention provides convenient and reliable retention of a cable entering the closure. The cable attachment of various embodiments of the present invention comprises an adapter body configured to be positioned adjacent the opening of the closure, such as within the opening in some embodiments. A grip device is also included in the cable attachment and is positioned within an opening of the adapter body. A grommet device is also positioned within the opening of the adapter body and proximate the grip device. The grip device, such as a grip washer or set screw in various embodiments of the present invention, provides an aperture sized to grip at least a portion of the outer surface of the cable, and the grommet device provides a passageway to allow the cable to traverse the grommet device in a generally axial direction relative to the cable. The cable attachment also includes a bolt portion configured to engage the opening of the adapter, such as by threading in some embodiments of the present invention, to selectively apply a force, such as a compressive force, upon the grommet device so that the grommet device engages the outer surface of the cable. Therefore, the cable attachment of some embodiments of the present invention seals the cable entry by compressing the grommet device around the cable and, additionally, the cable attachment retains the cable with the grip device. Various embodiments of the present invention also comprise a telecommunications closure that includes one or more cable attachments, such as the cable attachment described above.

The present invention also comprises methods for conveniently inserting a cable into a telecommunications closure to seal and retain the cable. One embodiment of the present invention comprises inserting the cable through the bolt portion, the passageway of the grommet device, through the aperture of the grip device, and through the opening of the adapter body. Once the cable is properly positioned in an axial direction, the bolt device is moved relative to the adapter body to seal and retain the cable. Still further embodiments of the present invention provide additional apparatuses and methods for sealing and retaining a cable entering a telecommunications closure.

BRIEF DESCRIPTION OF THE SEVERAL VIEWS OF THE DRAWINGS

Figure 1:
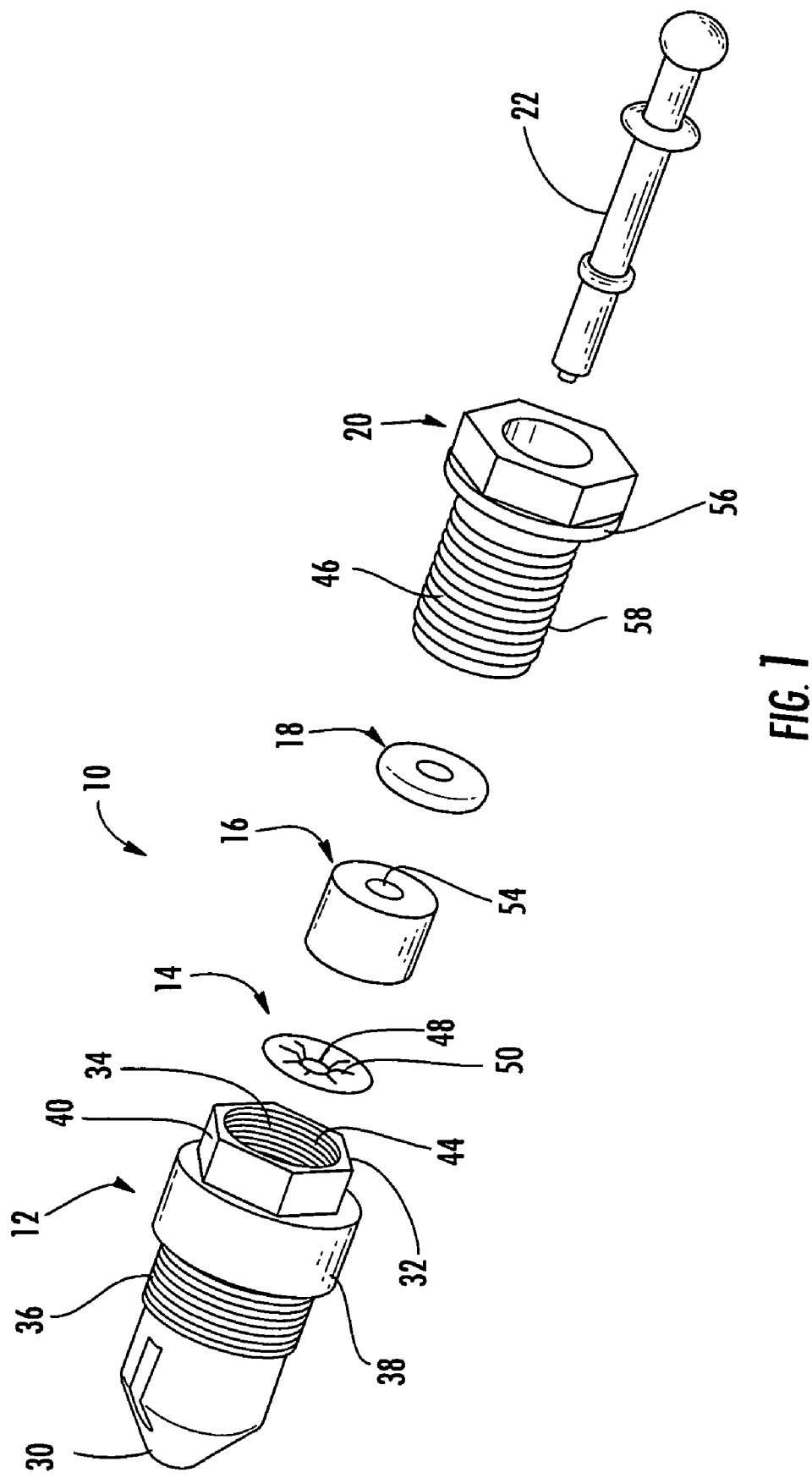
Figure 2:
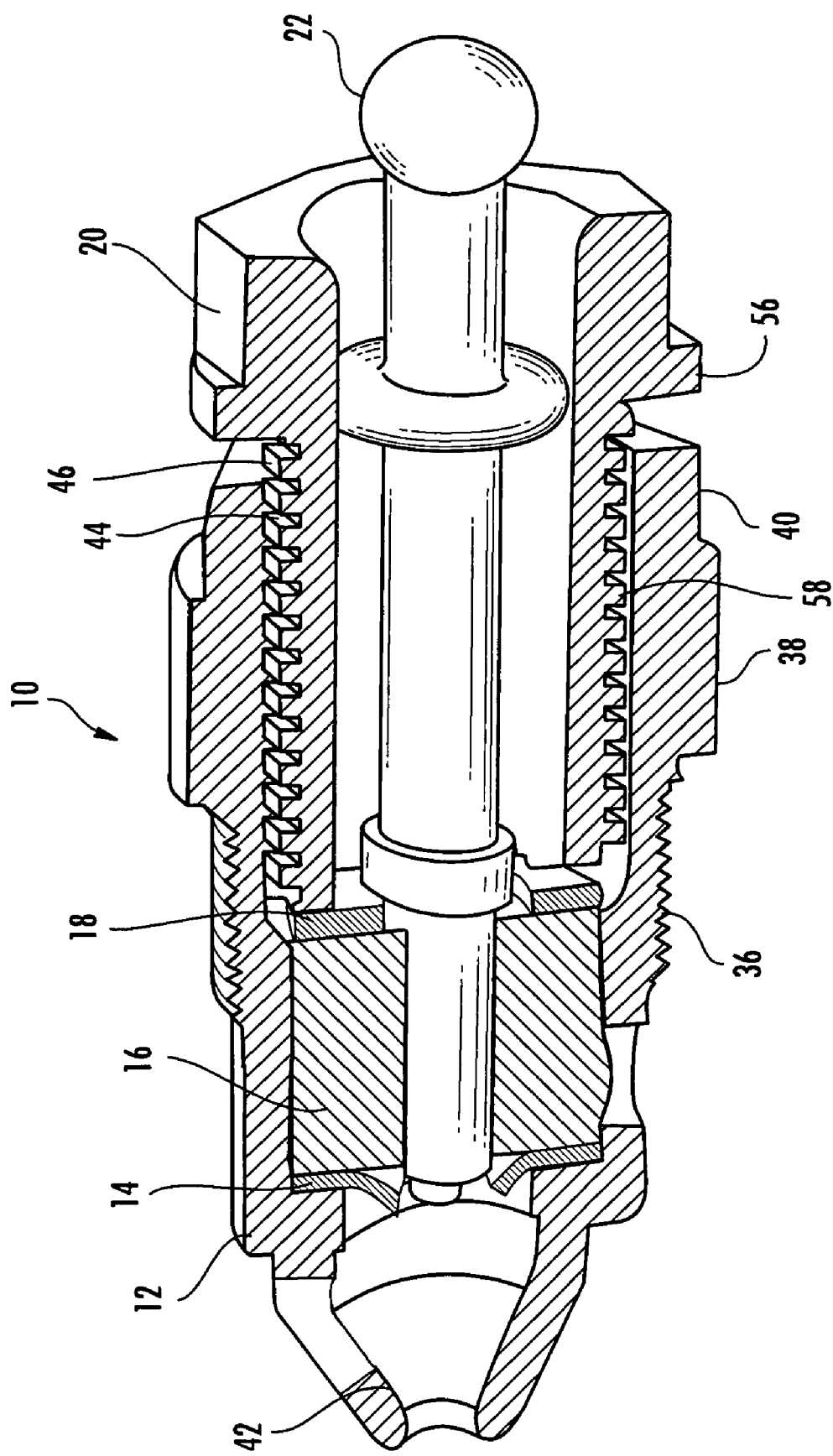
Figure 3:
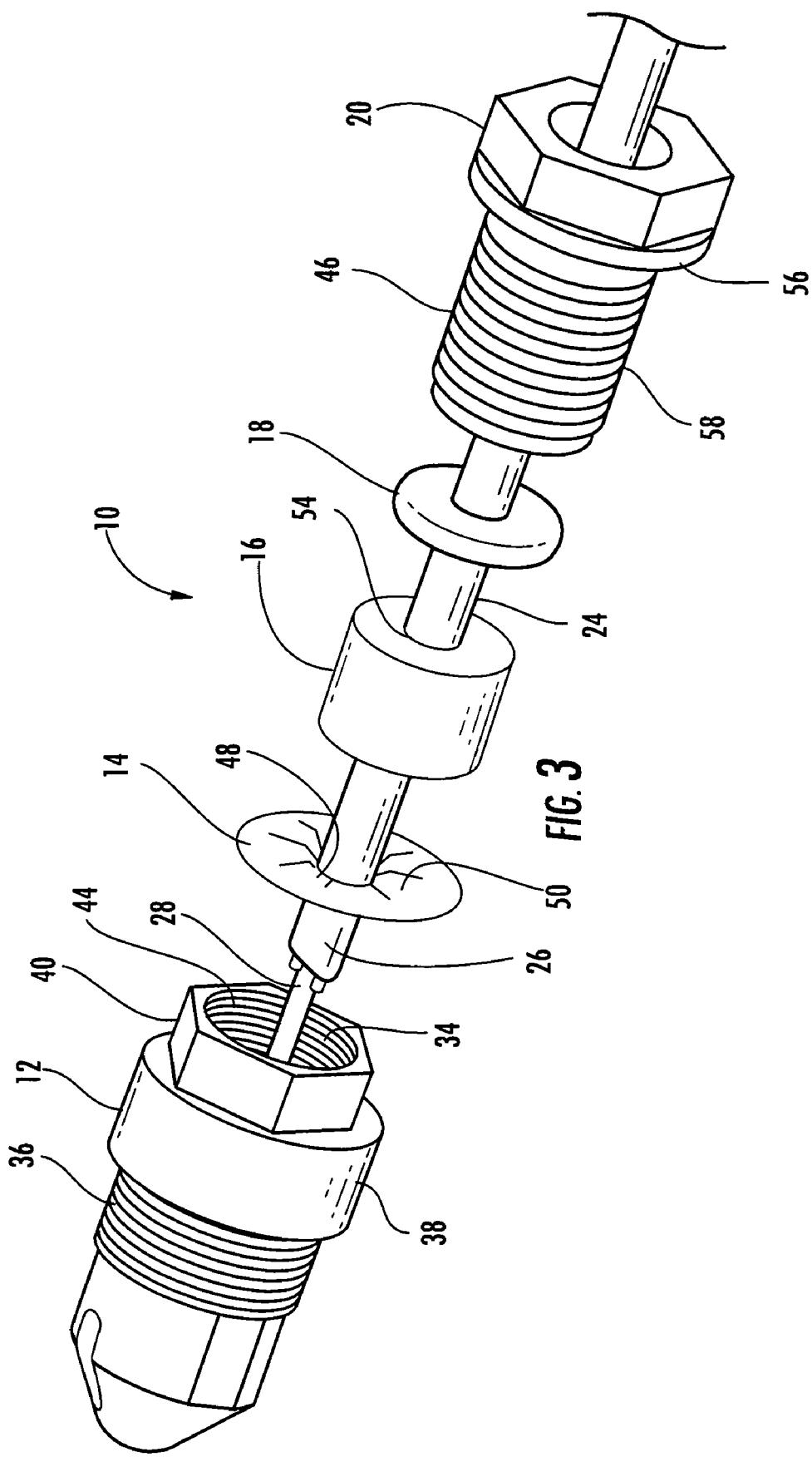
Figure 4:
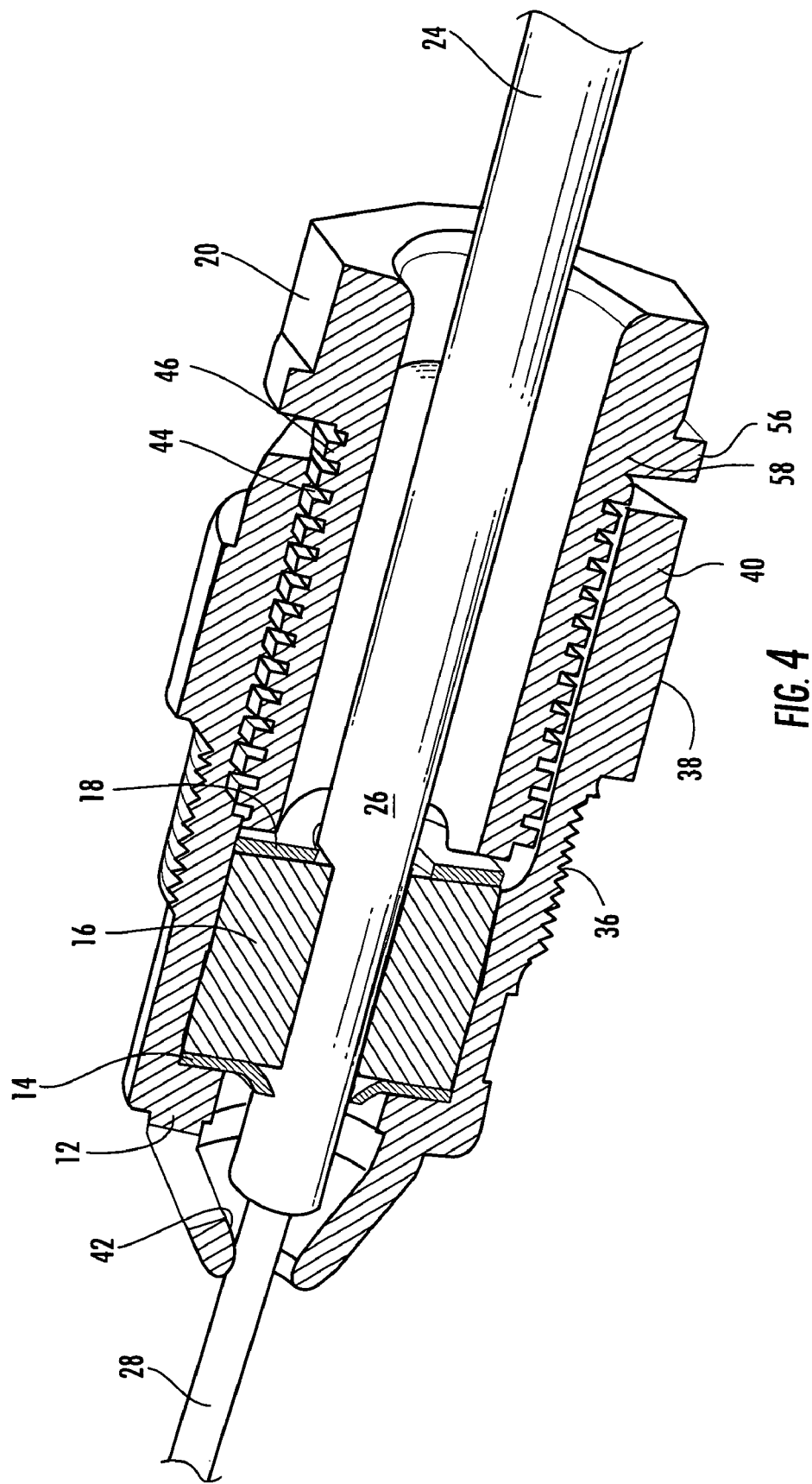
Figure 5:
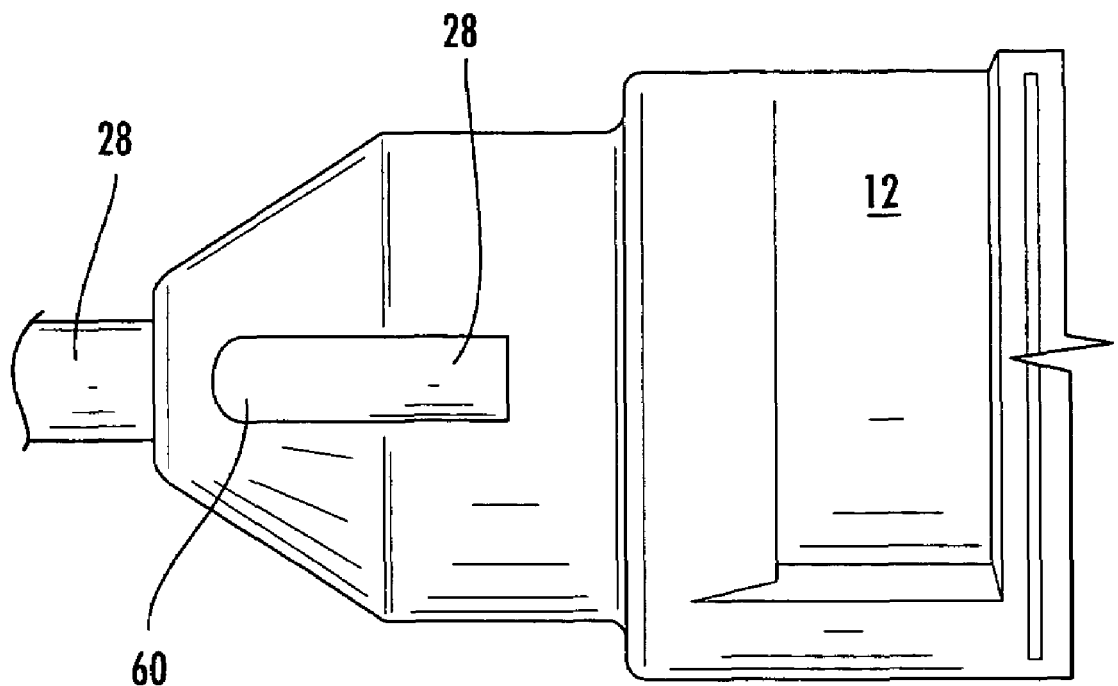
Figure 6:
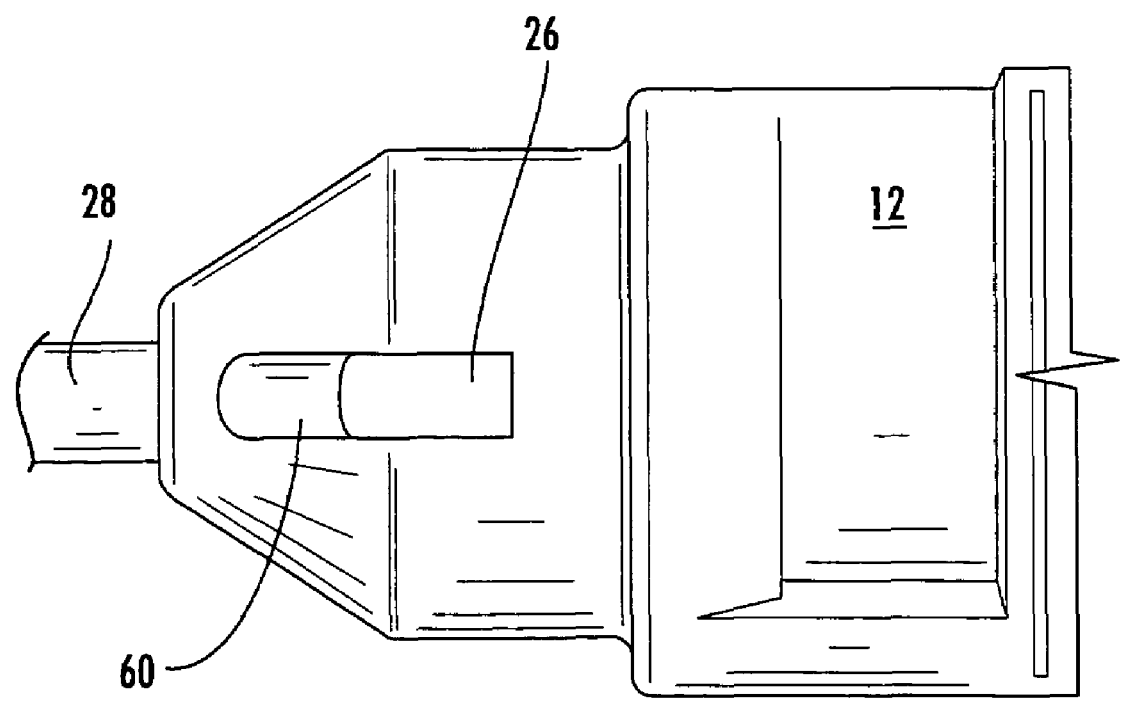
Figure 9A:
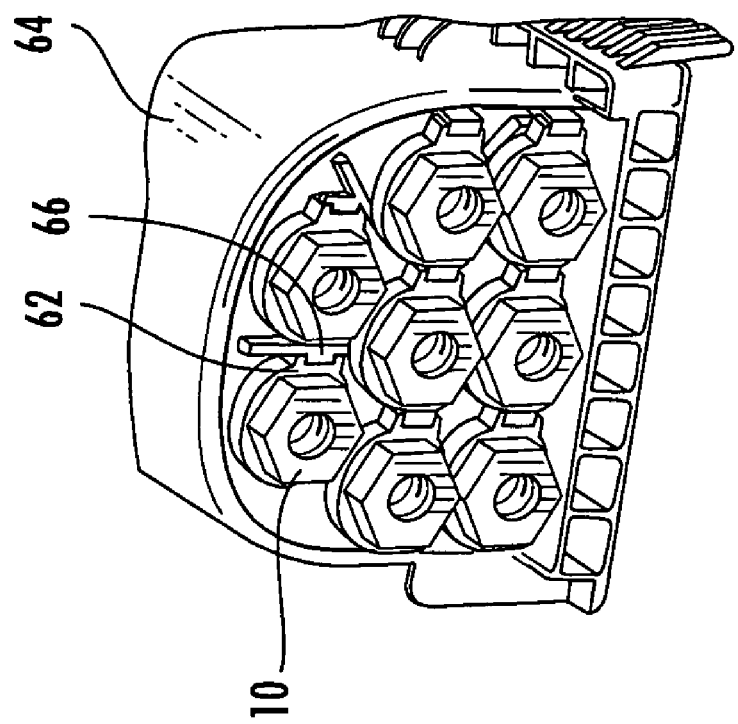
Figure 9B:
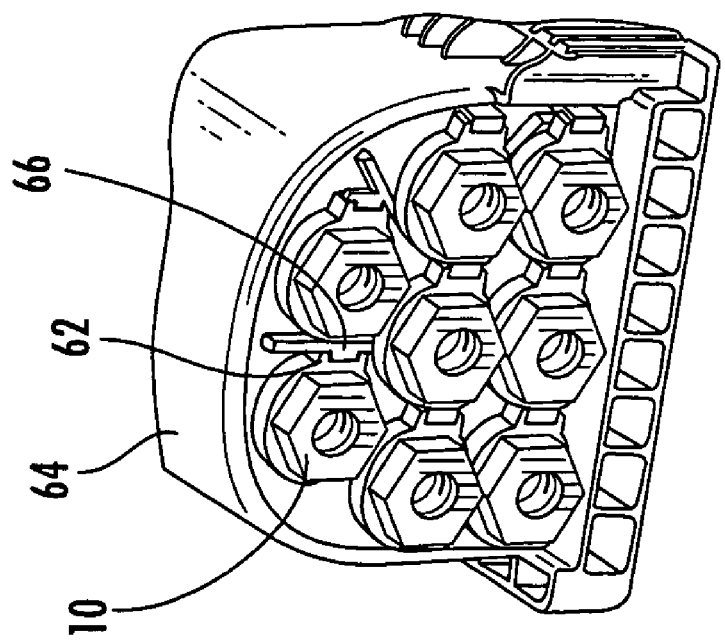
Figure 11:
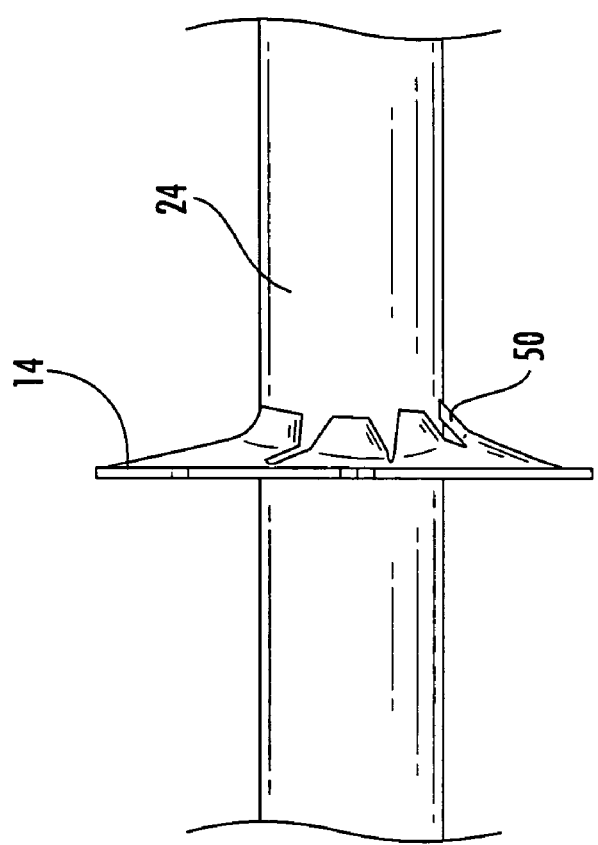
Figure 10B:
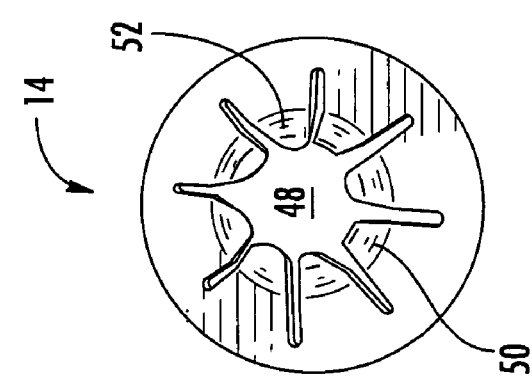
Figure 10A:
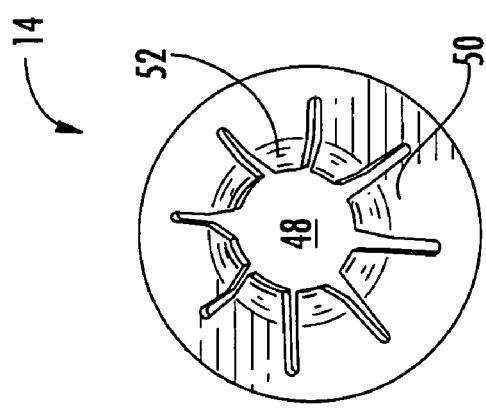
Figure 12:
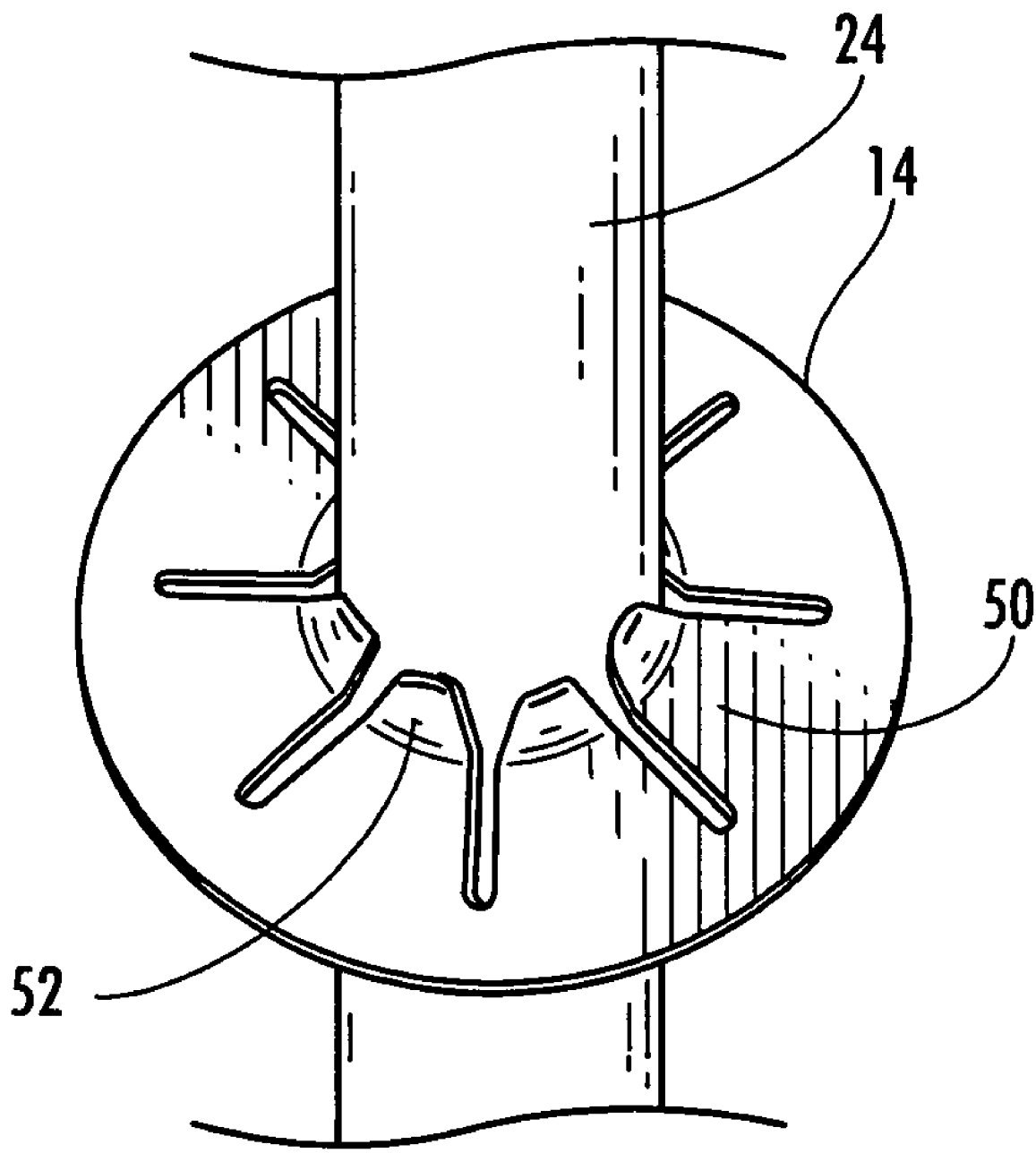
Figure 13:
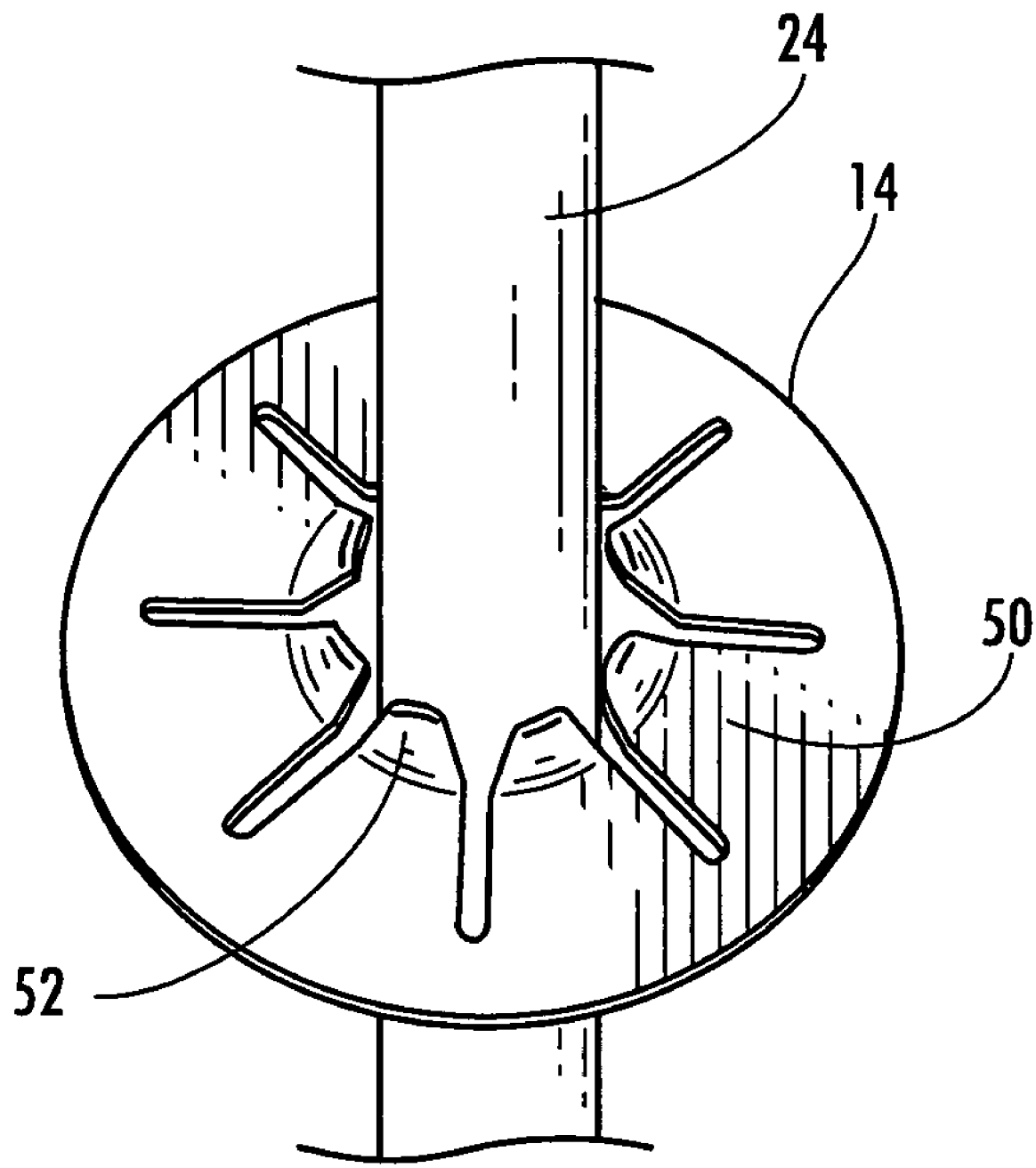
Figure 14A:
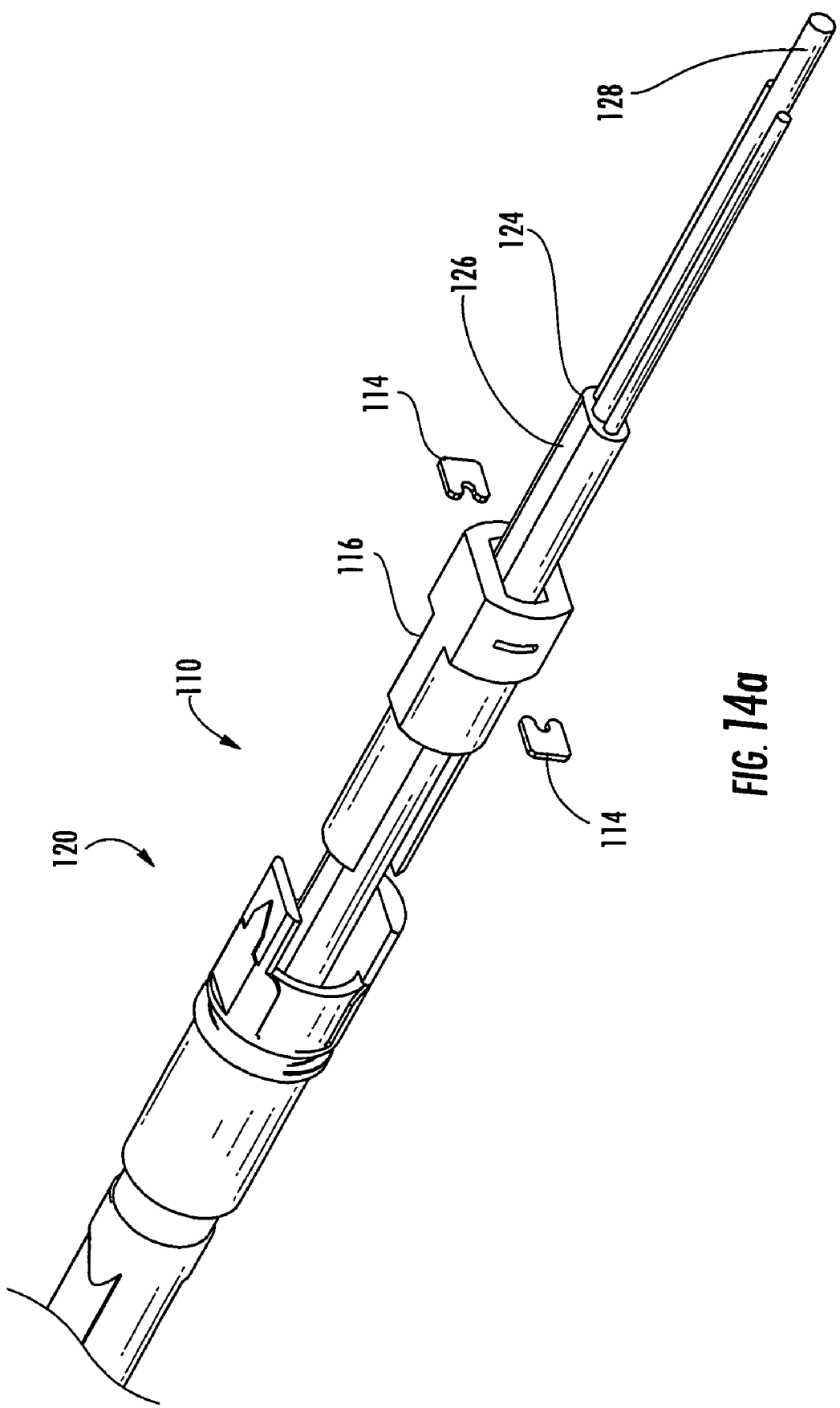
Figure 14B:
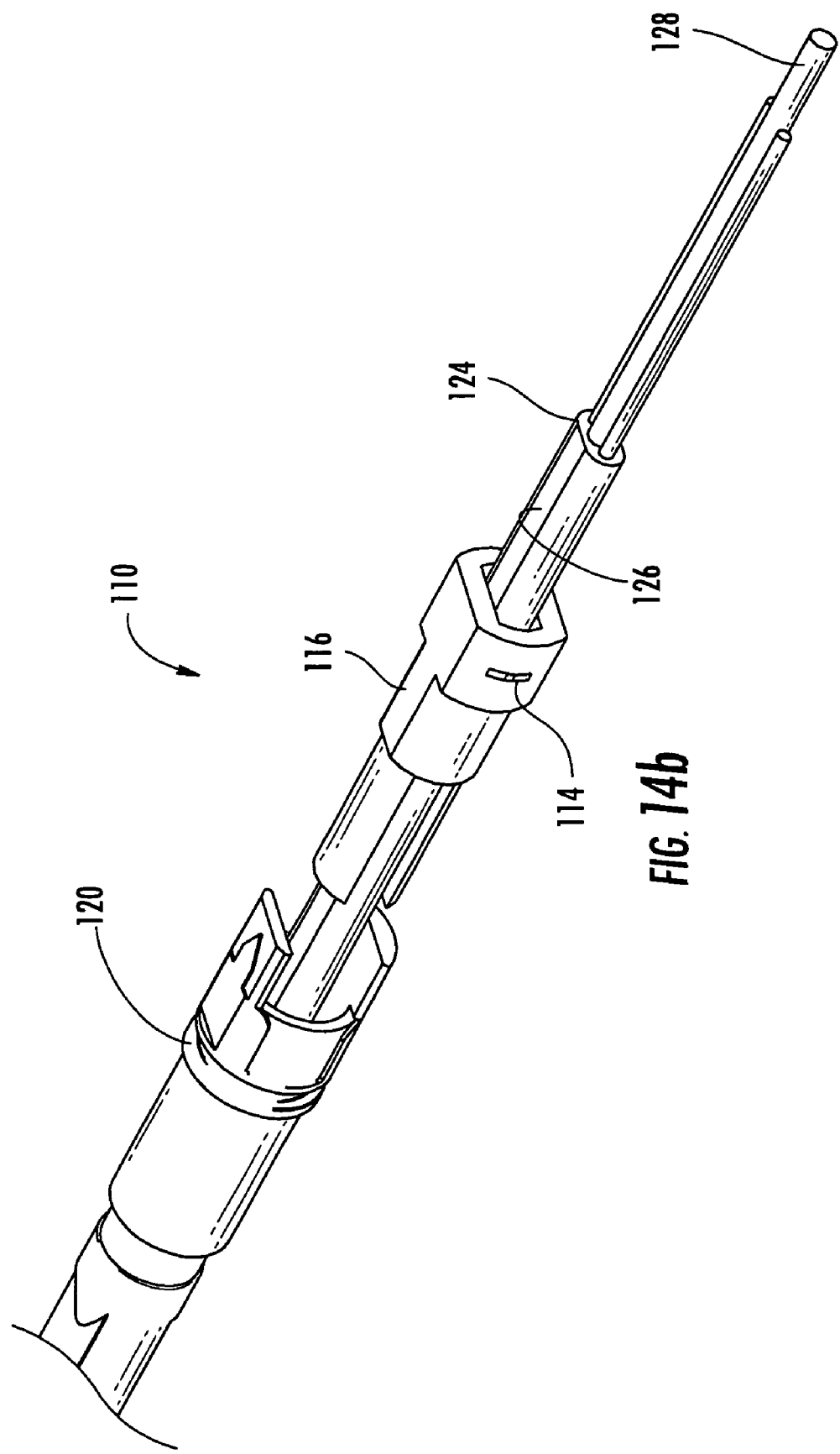
Figure 15A:
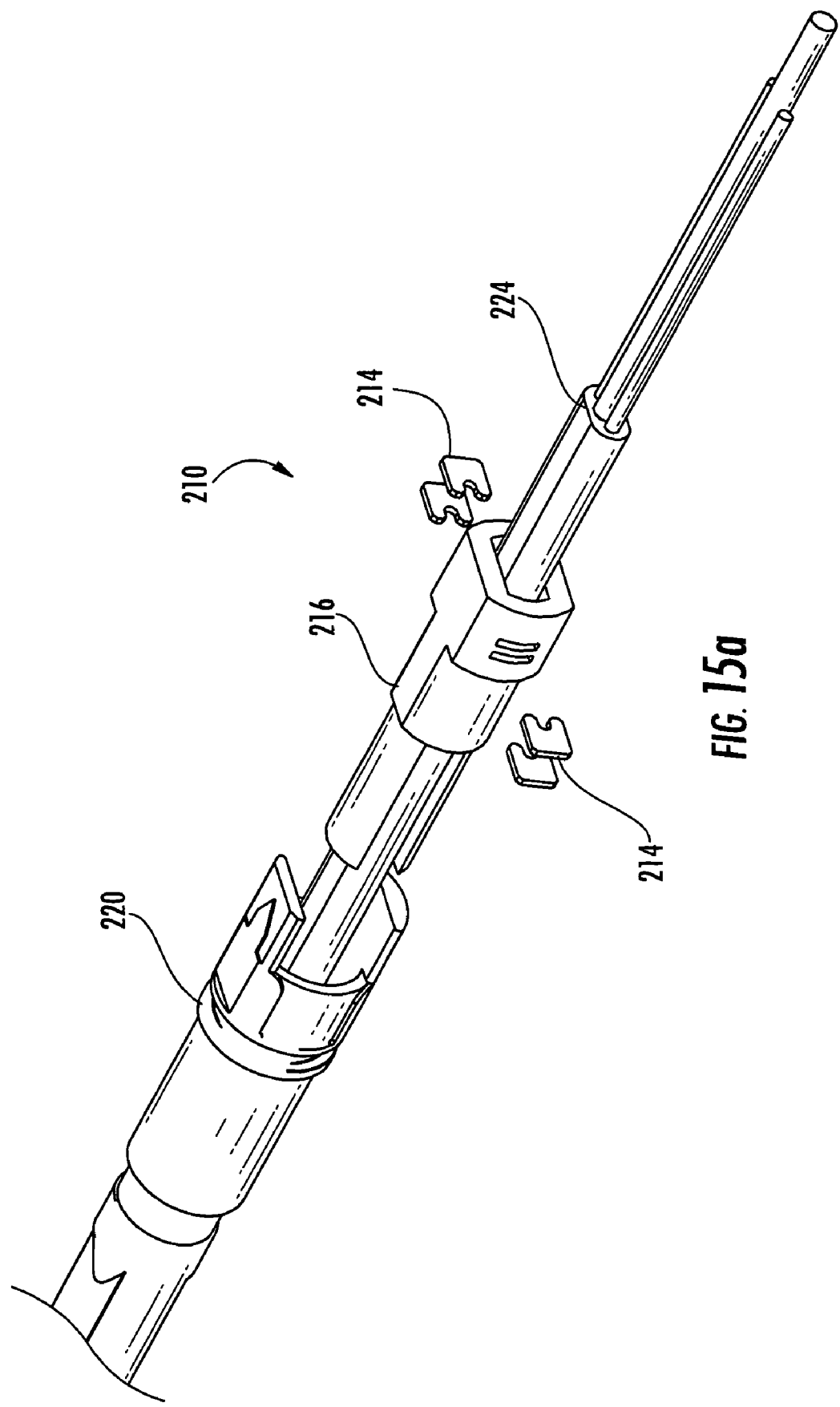
Figure 15B:
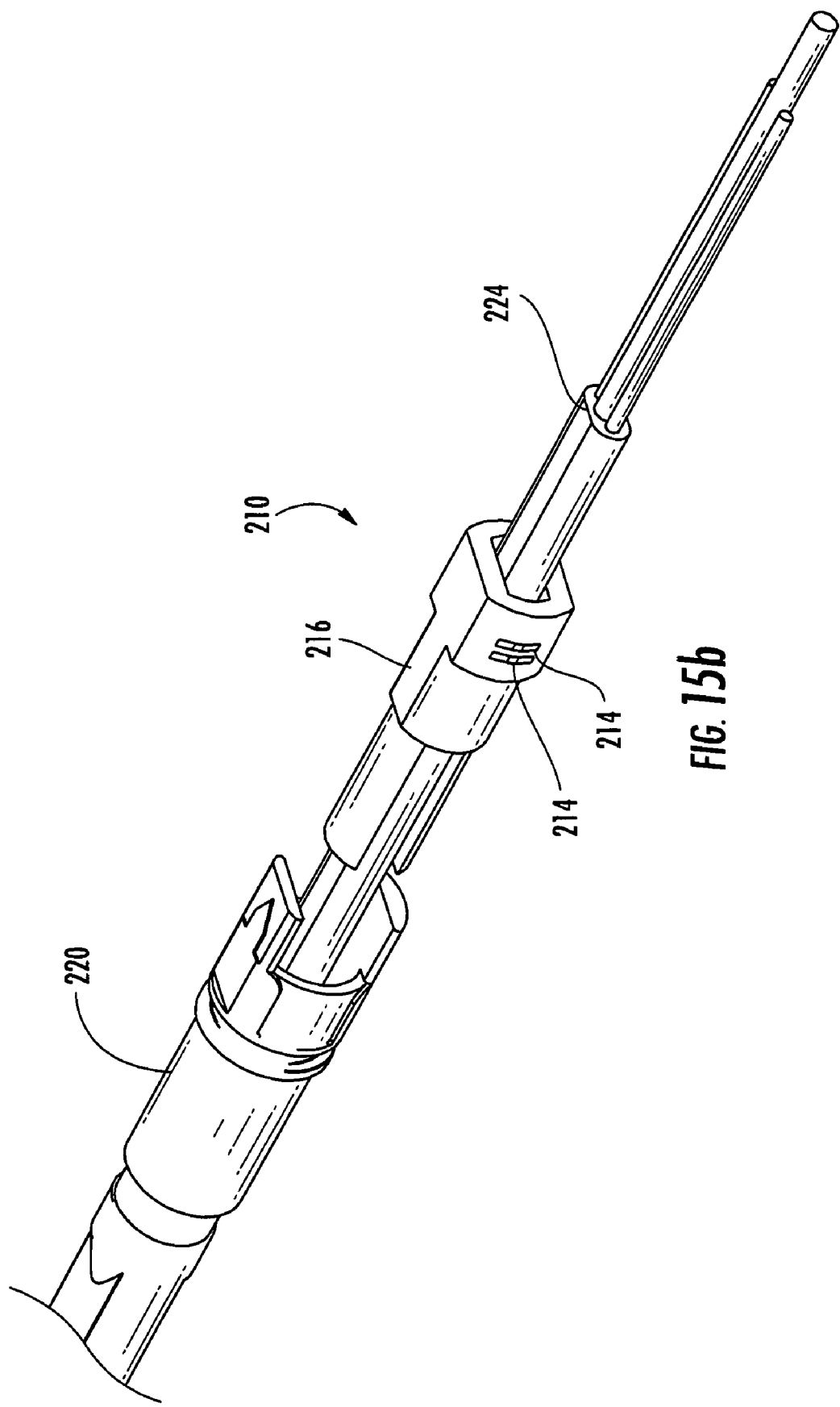
Figure 16A:
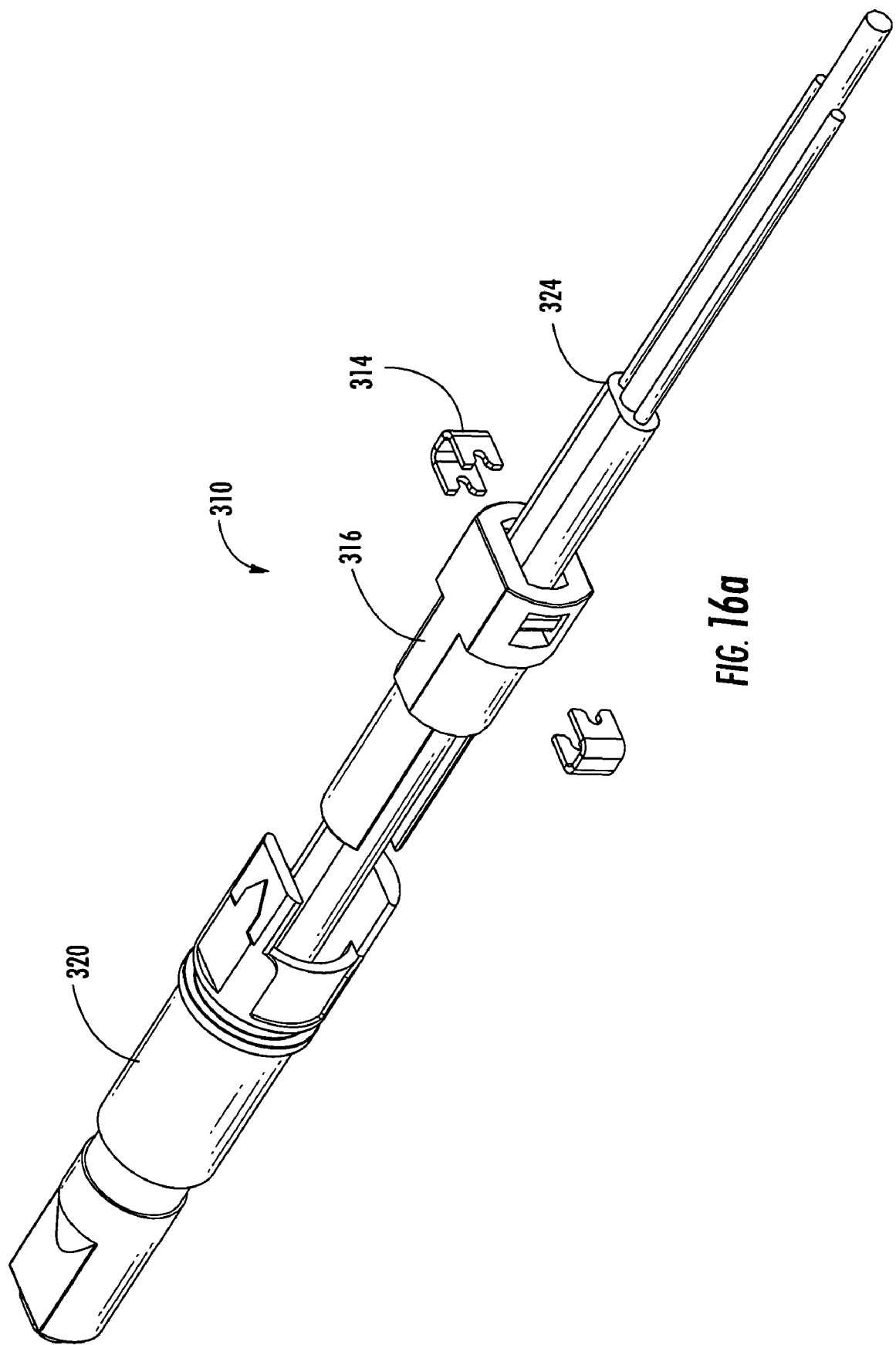
Figure 16B:
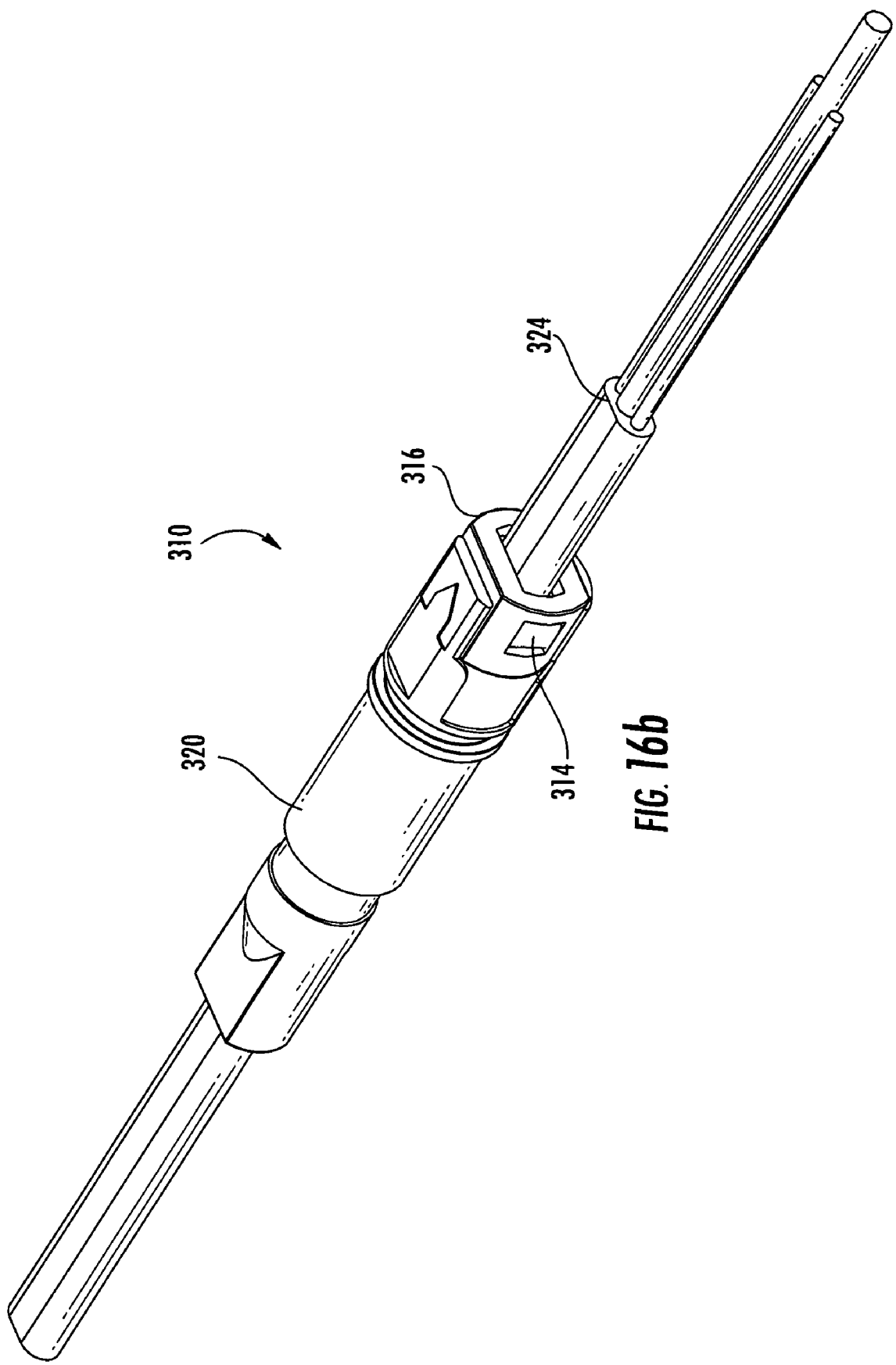
Figure 16C:
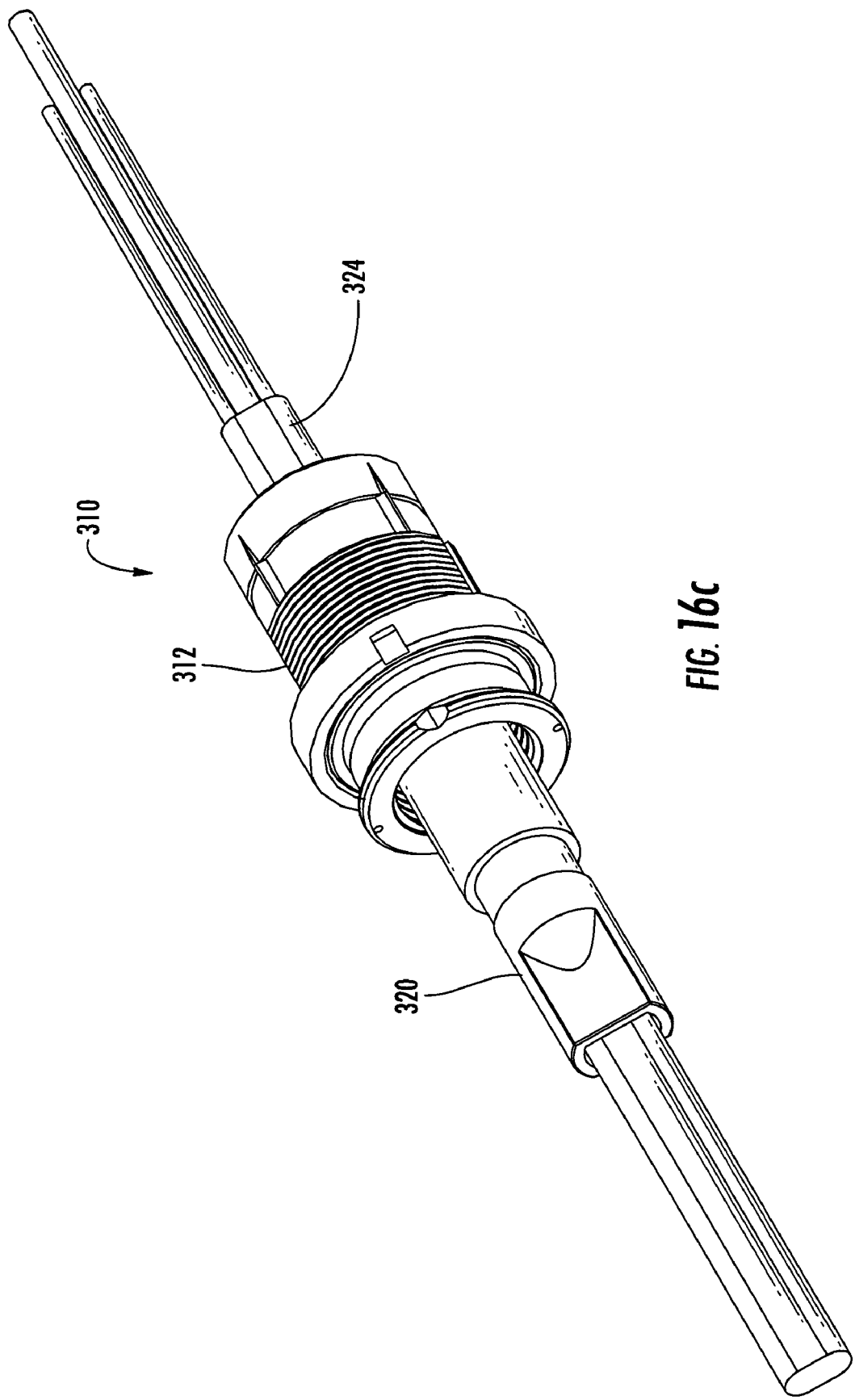
Figure 16D:
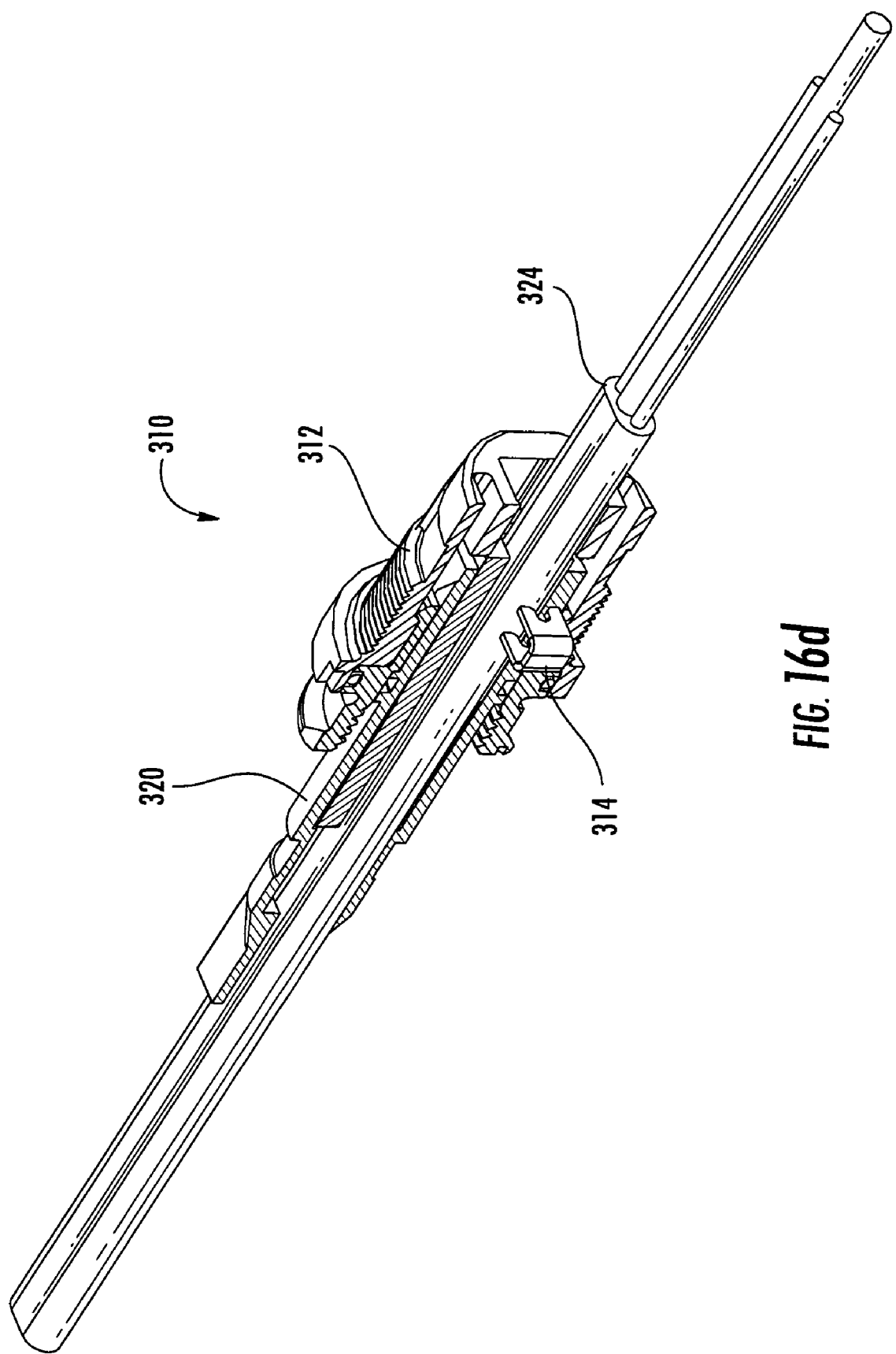
Figure 17A:
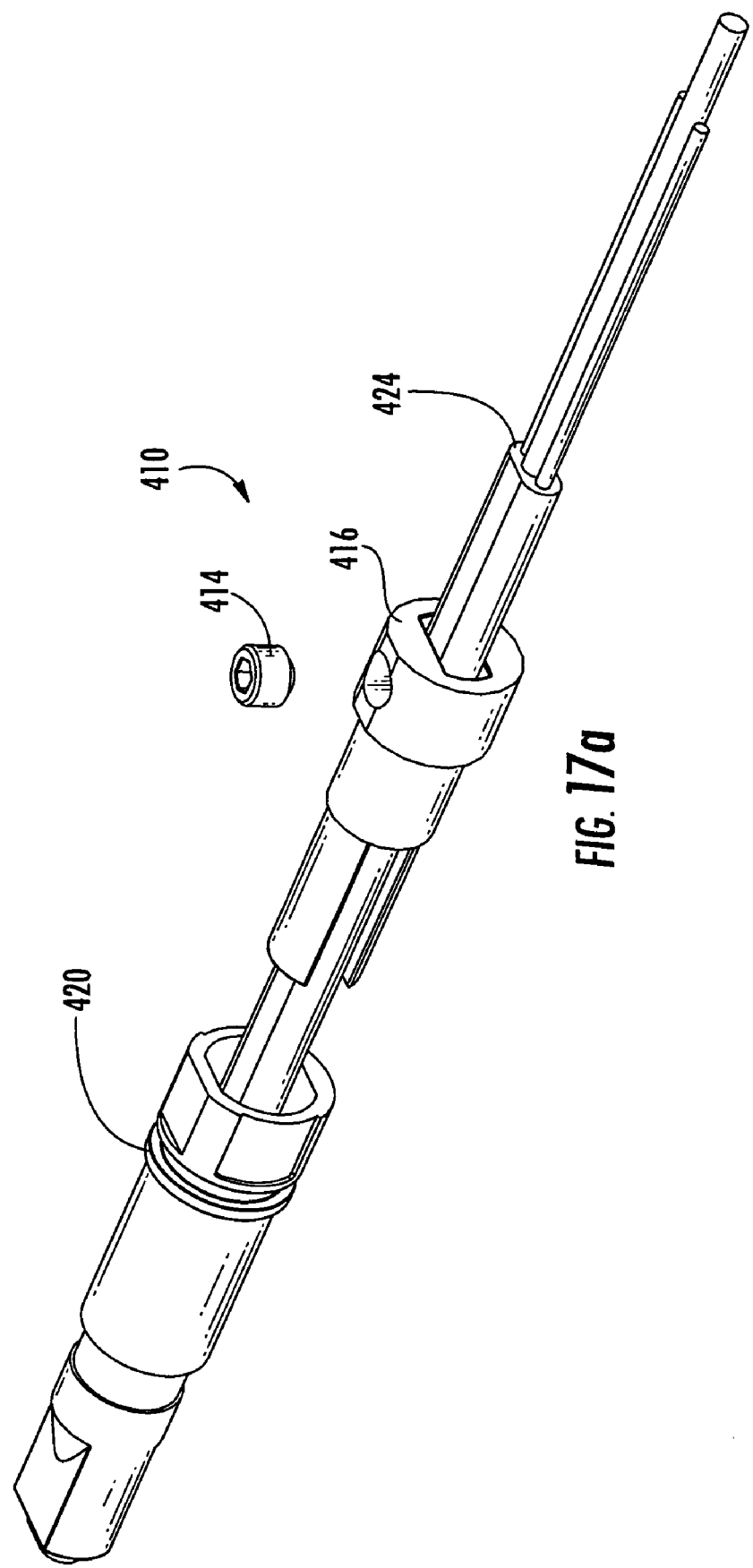
Figure 17B:
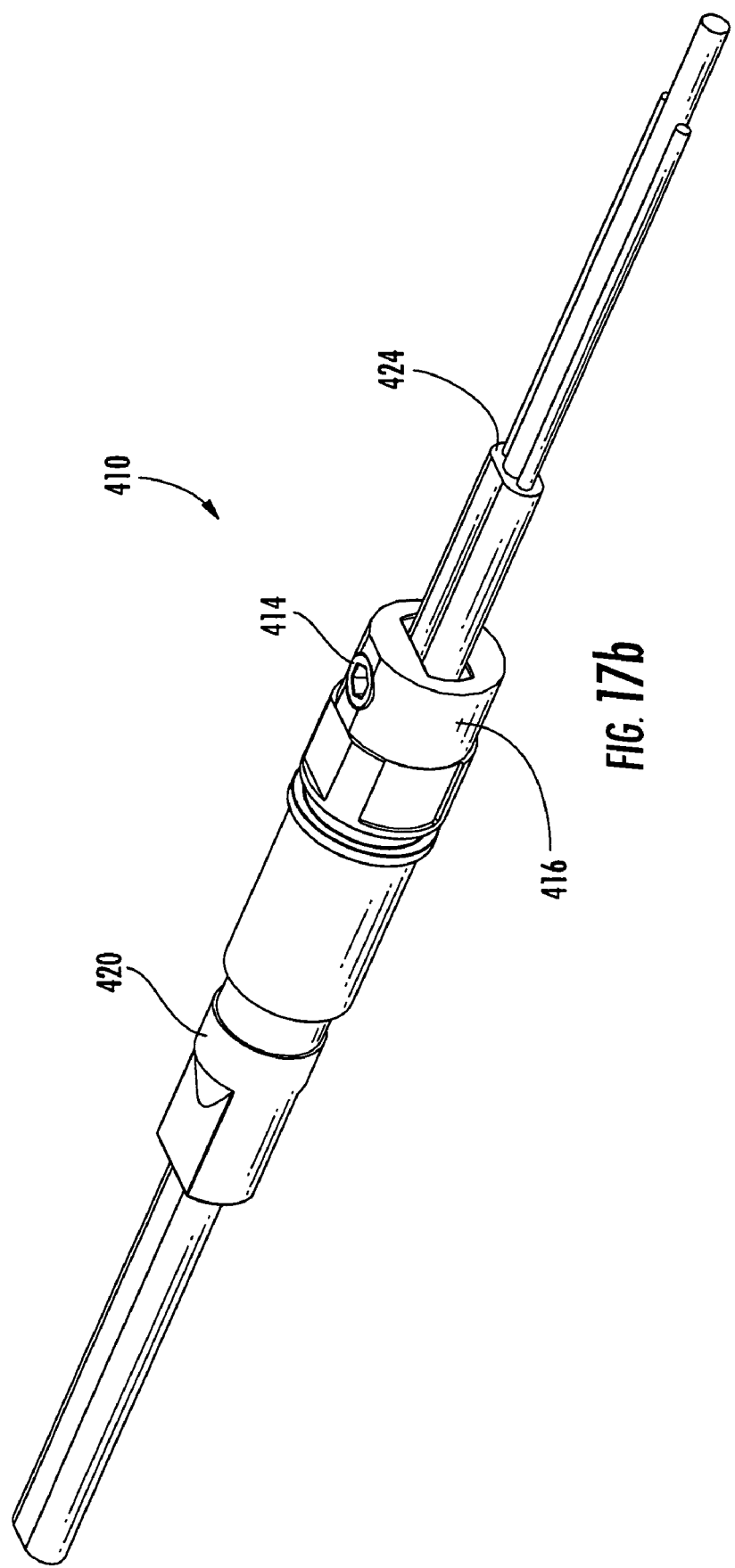
Figure 17C:
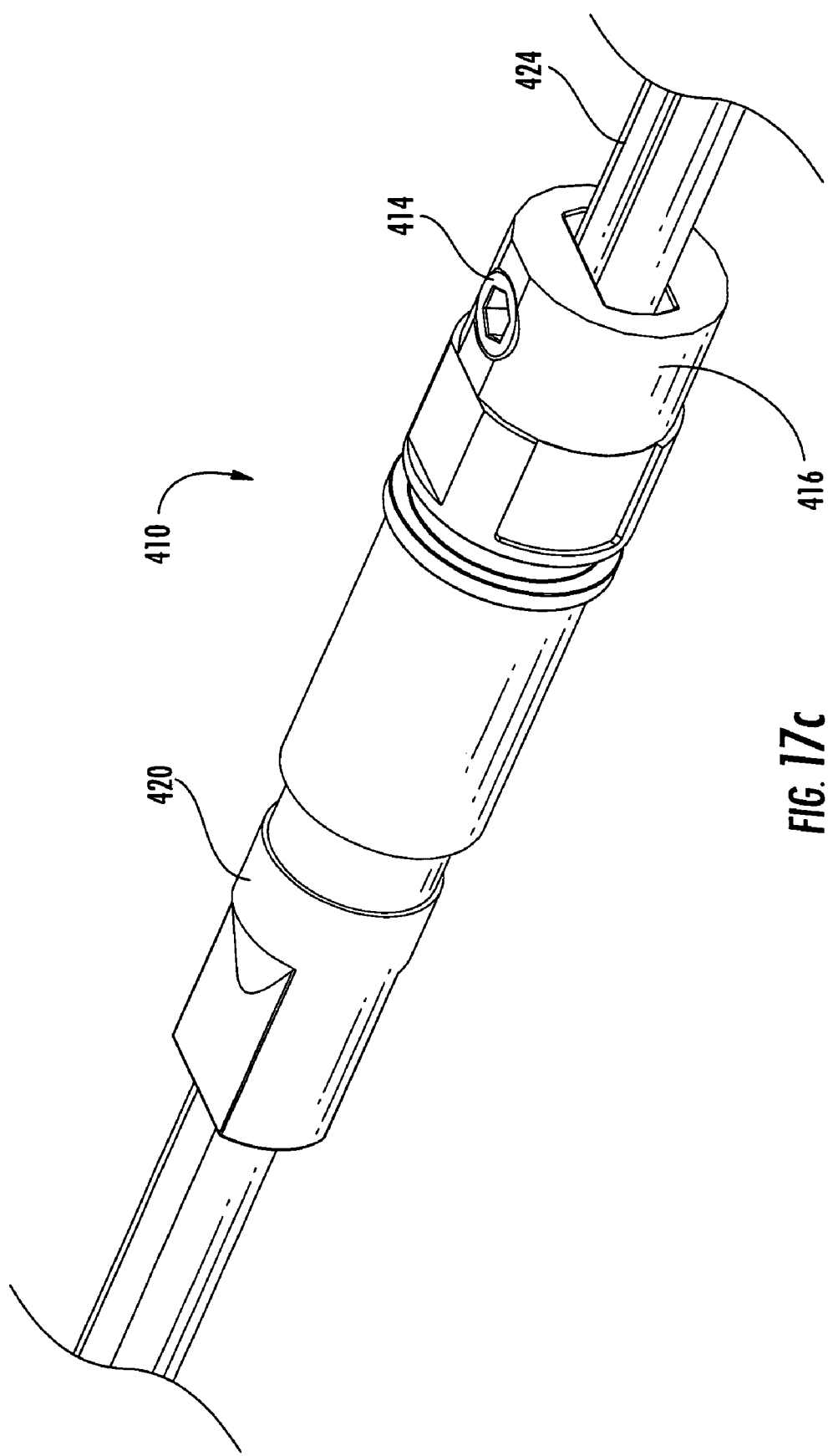
Figure 17D:
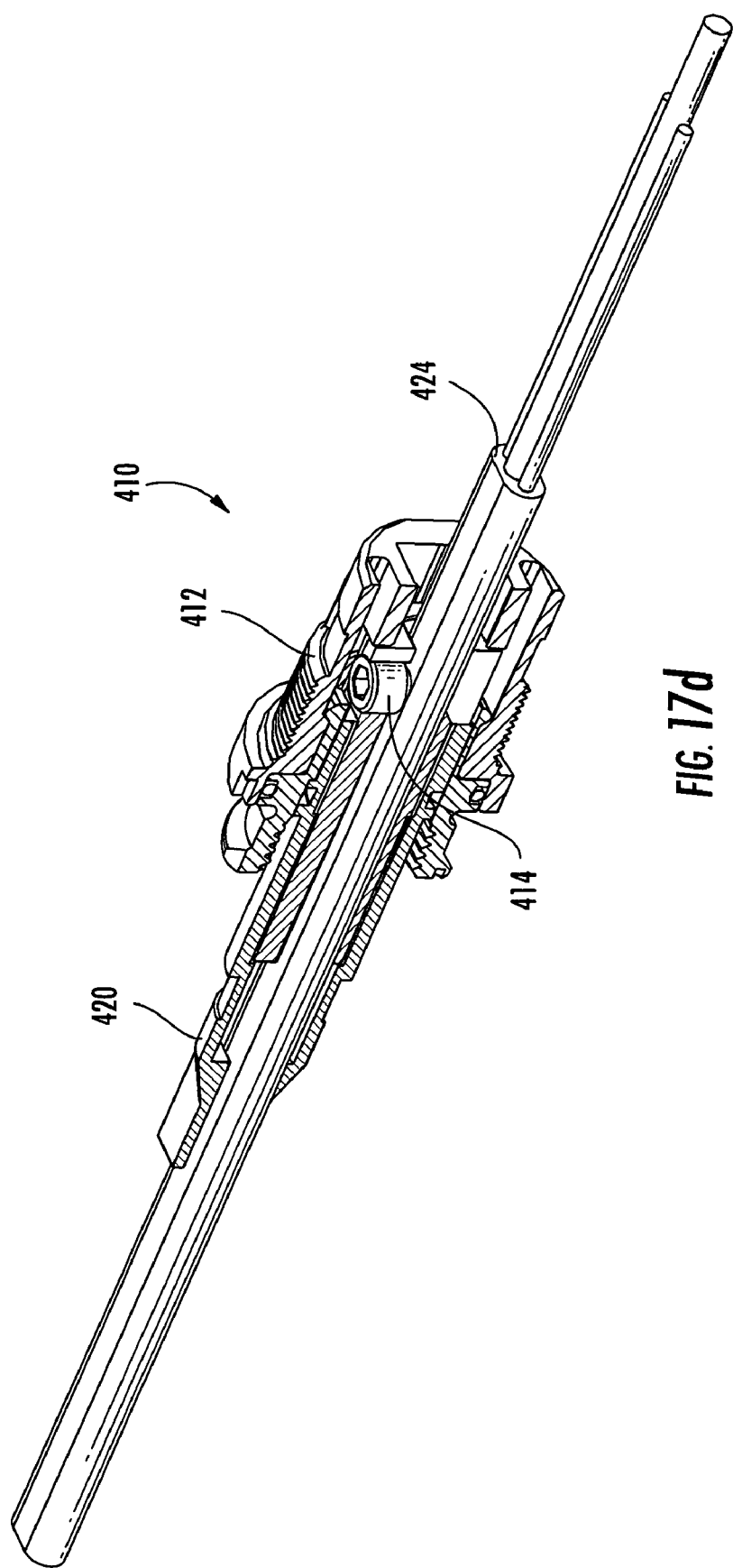
Figure 18A:
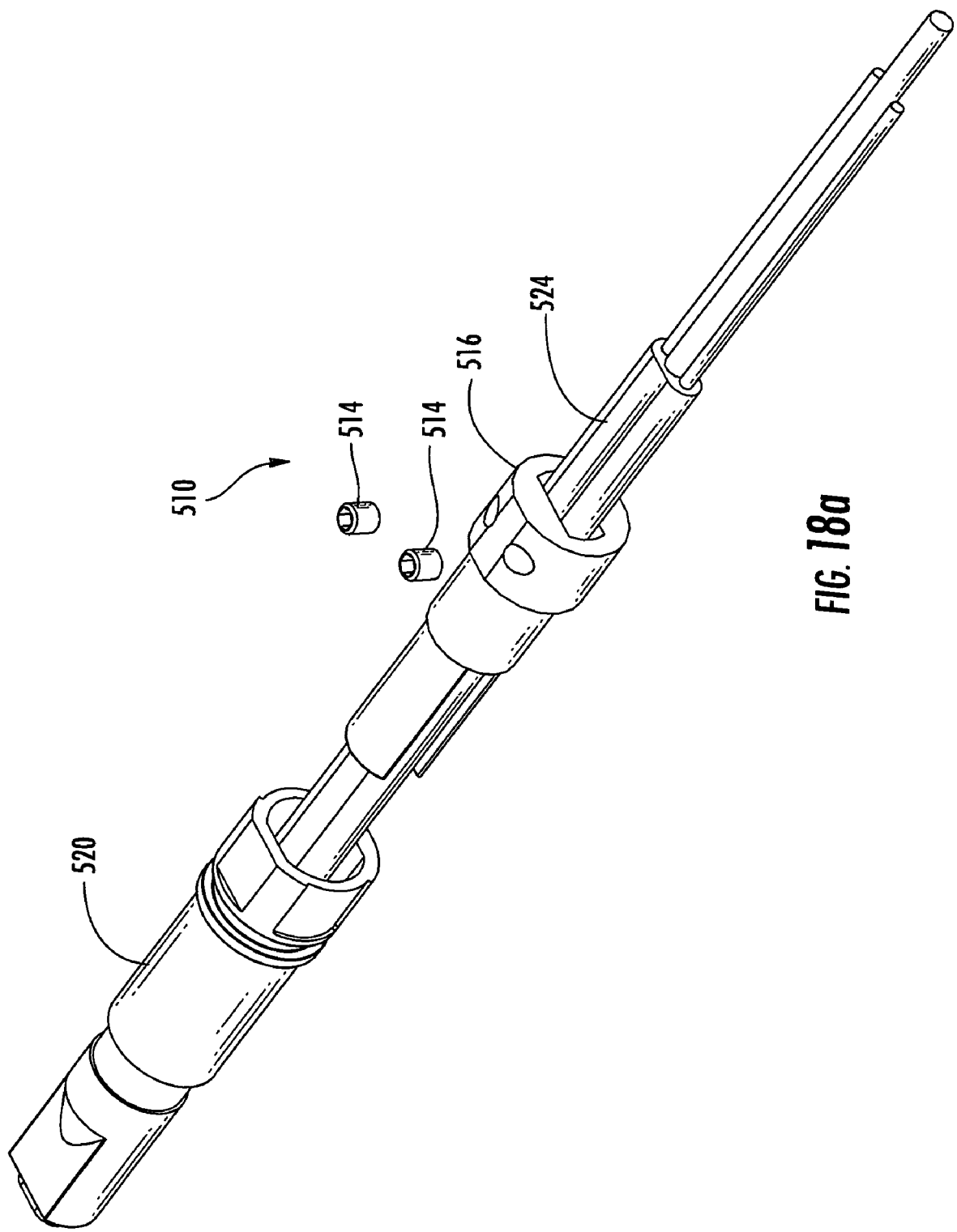
Figure 18B:
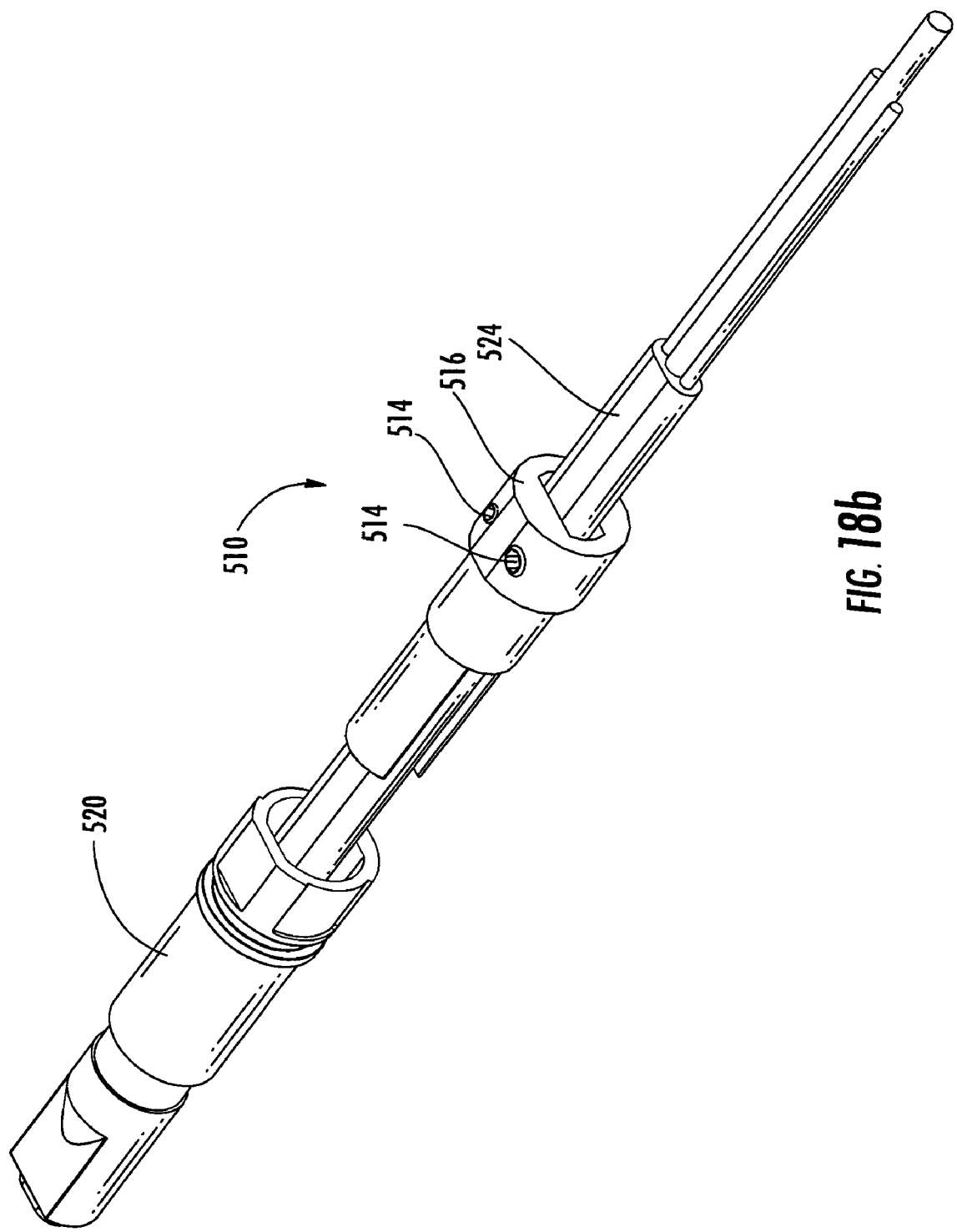
Figure 18C:
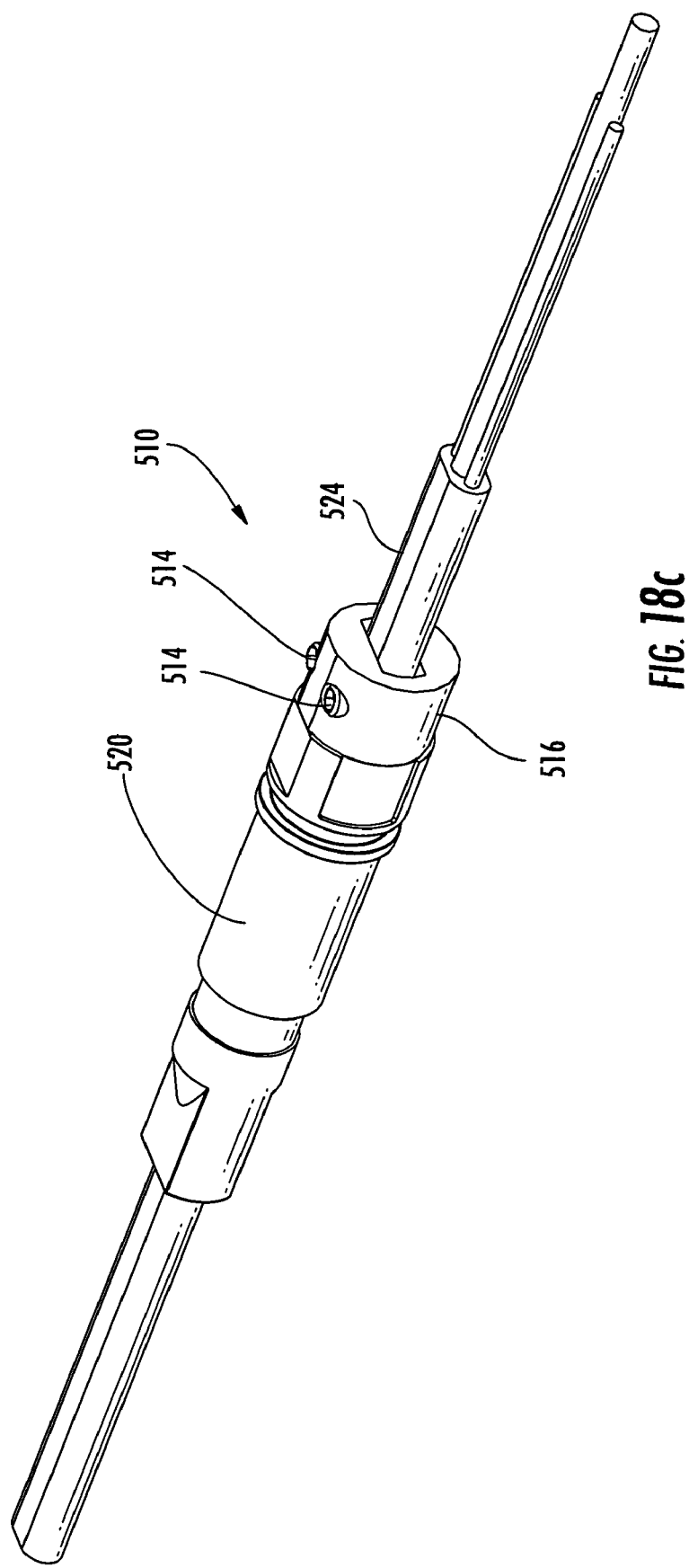
Figure 18D:
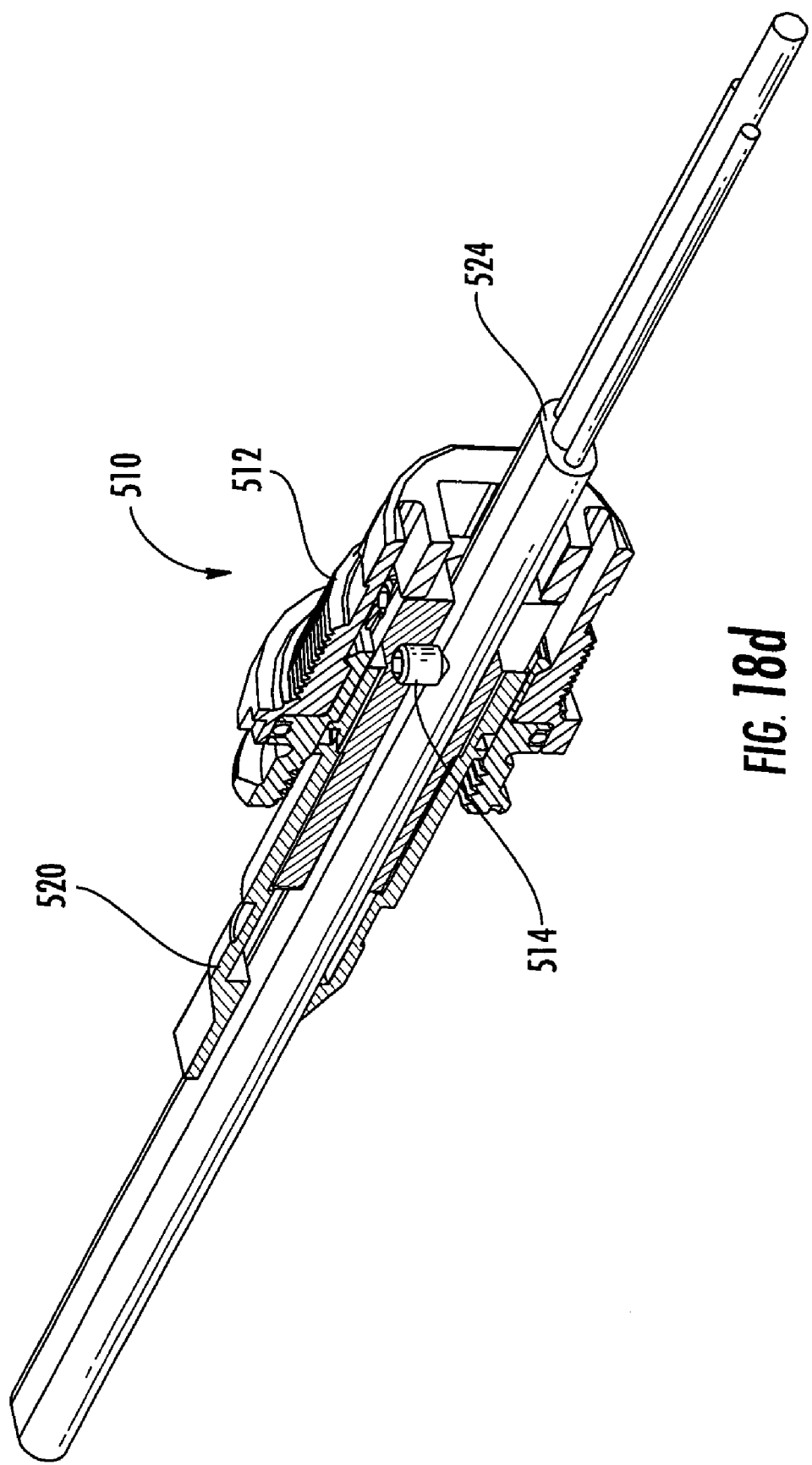

Having thus described the invention in general terms, reference will now be made to the accompanying drawings, which are not necessarily drawn to scale and are meant to be illustrative and not limiting, and wherein:

FIG. 1 is an exploded perspective view of a cable attachment in accordance with a first embodiment of the present invention, illustrating an optional plug that may be selectively inserted into the cable attachment;

FIG. 2 is a cross-sectional view of the cable attachment of FIG. 1, illustrating the cable attachment assembled and retaining the optional plug;

FIG. 3 is an exploded perspective view of the cable attachment of FIG. 1, illustrating a cable passing through the bolt portion, a flat washer, a grommet device, a grip device, and an adapter body;

FIG. 4 is a cross-sectional view of the cable attachment of FIG. 1, illustrating the cable attachment assembled and retaining a cable with a stripped jacket;

FIG. 5 is a side view of the cable attachment of FIG. 1, illustrating the view window that reveals a stripped jacket that has not been fully inserted;

FIG. 6 is a side view of the cable attachment of FIG. 1, illustrating the view window that reveals a stripped jacket that has been fully inserted;

FIG. 7 is a perspective view of the cable attachment of FIG. 1, illustrating the adapter body of the cable attachment;

FIG. 8 is a perspective view of the cable attachment of FIG. 1, further illustrating the adapter body of the cable attachment;

FIGS. 9a and 9b are partial perspective views of cable attachments in accordance with a second embodiment of the present invention installed on different closures, wherein the tab portions of the adapter bodies are rotationally locked by the protrusions of the closure;

FIGS. 10a and 10b are a top view and bottom view, respectively, of a grip device in accordance with a third embodiment of the present invention, illustrating a grip device that comprises a grip washer;

FIG. 11 is a side view of the grip device of FIGS. 10a and 10b positioned on a cable, illustrating the grip device gripping the cable;

FIG. 12 is a perspective view of the grip device of FIGS. 10a and 10b positioned on an elliptical jacketed cable, illustrating the grip device gripping the radially extended portions of the elliptical jacketed cable;

FIG. 13 is a perspective view of the grip device of FIGS. 10a and 10b positioned on an elliptical jacketed cable, illustrating the grip device not gripping the radially inward portions of the elliptical jacketed cable;

FIGS. 14a-d are perspective views of a cable attachment in accordance with a fourth embodiment of the present invention, wherein the grip device comprises a single flat jacket piercing grip device;

FIGS. 15a-d are perspective views of a cable attachment in accordance with a fifth embodiment of the present invention, wherein the grip device comprises a double flat jacket piercing grip device;

FIGS. 16a-d are perspective views of a cable attachment in accordance with a sixth embodiment of the present invention, wherein the grip device comprises a U-shaped jacket piercing grip device;

FIGS. 17a-d are perspective views of a cable attachment in accordance with a seventh embodiment of the present invention, wherein the grip device comprises a single setscrew; and FIGS. 18a-d are perspective views of a cable attachment in accordance with a eighth embodiment of the present invention, wherein the grip device comprises a double setscrew.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for sealing and/or strain relieving cables inserted into telecommunications closures are described and shown in the accompanying drawings with regard to specific types of cable attachments, it is envisioned that the functionality of the various apparatus and methods may be applied to any now known or hereafter devised cable attachment in which it is desired to seal and/or strain relieve cables inserted into telecommunications closures. Like numbers refer to like elements throughout.

With reference to FIGS. 1-18d, cable attachments in accordance with various embodiment of the present invention are illustrated. The cable attachments of the present invention may be used with any telecommunications closure for any telecommunications system, such as copper, fiber optic cable, or other systems. Furthermore, the cable attachments of the present invention may be used with any type of closure, including, but not limited to, network interface devices, network access point closures, pedestals, local convergence cabinets, aerial closures, splice closures, terminals, and the like, whether located aerially, above ground, below grade, or in any other fashion. The cable attachments may be provided individually to be installed in pre-existing closures, or the cable attachments may be provided with the closures either permanently attached or selectively removable. Furthermore, the cable attachments may be sized to accommodate any sized cable of any material and/or comprising any number of individual fibers, fiber arrays, lines, or other signal carriers therein. Further embodiments of the present invention include cable attachments designed to seal and retain two or more individual cables with a single cable attachment. In addition, although the cable attachments of the embodiments disclosed herein are intended to seal and retain a cable entering a telecommunications closure, further embodiments of the present are adapted to either seal a cable or retain a cable as required by the specific performance requirements.

Turning now to the cable attachment of the embodiment illustrated in FIGS. 1-8, the cable attachment 10 comprises an adapter body 12, a grip device 14, a grommet device 16, a washer 18, and a bolt portion 20. Also shown in FIGS. 1 and 2 is an optional plug 22 that is selectively provided to occupy the opening of the cable attachment when a cable is not inserted in the cable attachment to prevent the ingress of water, dirt, moisture, infestation, or other undesirable matter into the closure prior to insertion of a cable. The plug 22 is configured to be inserted into the cable attachment 10 a predetermined axial distance (which is limited by one or more collars shown in FIGS. 1-2) such that the plug is engaged by the grommet device 16 but not the grip device 14, as insertion of the plug into the grip device could damage the grip device and complicate removal of the plug.

FIGS. 3 and 4 illustrate the cable attachment 10 used with a cable 24 that includes a jacket 26 that has been stripped to expose the required length of buffer tube 28 and optical fiber (not shown) within the buffer tube to enable the technician to splice, connect, or perform other operations on the optical fiber within the closure either before or after the cable has been sealed and retained by the cable attachment. As described in more detail below, further embodiments of the present invention include cable attachments that do not require the cable to be stripped or provide for the cable to be stripped at any axial location of the cable relative to the cable attachment.

The adapter body 12 of the cable attachment 10 of FIGS. 1-8 comprises a unitary component made of thermoplastic material; however, further embodiments of the present invention may be made of any number of components and of alternative materials such as metal to list an additional non-limiting example. The adapter body 12 of FIGS. 1-8 includes a first axial end 30 and a second axial end 32 generally opposed to the first axial end. The adapter body 12 provides at least one opening 34 sized to allow passage of at least one cable 24 through the adapter body in a generally axial direction. The opening 34 of the adapter body 12 may be completely encircled by the adapter body, such as with a through hole, or the opening may be partially encircled, such as with a slotted opening, channel, or the like, to give non-limiting examples of openings through the adapter body. The adapter body 12 defines a generally cylindrical shape with a frustoconical first axial end 30, an exterior threaded portion 36, a collar portion 38, and a hex portion 40; however, further embodiments of the present invention comprise alternative and/or additional shapes and/or features as suited for the particular closure and/or cable. The frustoconical first axial end 30 of the adapter body 12 is in part provided to create a lead-in surface 42, as shown in FIG. 2, to assist in the insertion of a cable 24 through the adapter body and out the opening of the first axial end of the adapter body. The frustoconical first axial end 30 also provides an area for the prongs of the grip device of the illustrated embodiment to move during insertion of the cable 24, as described in more detail below. The area inside the frustoconical first axial end 30 also allows portions of the cable proximate the stripped jacket, such as strength members extending from the jacket (described below), to have room to expand and contract based upon temperature variations. Referring again to the adapter body 12, as shown in FIGS. 1-8, the opening of the first axial end 30 of the adapter body 12 defines a smaller cross-sectional area relative to the cross-sectional area of the opening of the second axial end 32 of the adapter body.

As discussed in more detail below with reference to FIGS. 9a and 9b, the exterior threaded portion 36 of the adapter body is configured to pass through the opening of the closure and to be retained by the closure such that an interior portion of the adapter body at the first axial end of the adapter body is located inside the closure and an exterior portion at the second axial end of the adapter body is located outside the closure. More specifically, the first axial end 30 of the adapter body 12 is passed through the opening of the closure until the closure wall engages the collar portion 38. A retention device (not shown) that includes internal threading corresponding to the threading of the exterior threaded portion is inserted over the first axial end 30 of the adapter body and threaded toward the second axial end 32 until the retention device engages the interior of the closure to selectively retain the adapter body within the opening of the closure. Further embodiments of the present invention provide alternative structures and/or devices for retaining the adapter body and/or cable attachment relative to the closure. In addition, the illustrated embodiments of the present invention show the cable attachment configured for positioning within the opening of the closure; however, still further embodiments of the present invention are configured to position the adapter body and/or other components of the cable attachment adjacent the opening of the closure with or without any portion of the cable attachment passing through the opening of the closure. As used herein, "adjacent" is intended to mean that the adapter body is positioned near the opening and/or within the opening of the closure.

The hex portion 40 of the adapter body 12 of the cable attachment 10 of FIGS. 1-8 is positioned opposite the collar portion 38 from the threaded exterior portion 36. The hex portion 40 is provided on the exterior body 12 to enable a technician to prevent the adapter body from rotating during insertion and/or rotation of the bolt portion 20 of the illustrated embodiment. The opening 34 of the adapter body 12 extends from the axial second end 32 to the first axial end 30 a certain axial distance, and the adapter body defines a threaded interior portion 44 along the opening 34. Similarly, the bolt portion 20 defines a threaded exterior portion 46 along an exterior surface of the bolt portion that corresponds to the threaded interior portion 44 of the opening of the adapter body 12, such that the bolt portion can be selectively threaded into the adapter body. The hex portion 40 of the adapter body 12 may be clamped with a wrench by the technician while the technician threads the bolt portion 20 into the opening 34 of the adapter body 12 to keep the adapter body from unintentionally rotating. Further embodiments of the present invention provide alternative devices on the exterior and/or interior of the adapter body and/or bolt portion to allow a technician to conveniently move the bolt portion relative to the adapter body. Still further embodiments provide alternative shapes and/or features to enable the bolt portion and adapter body to be moved relative to one another and retained relative to one another.

Turning now to the grip device 14 of the cable attachment 10 of FIGS. 1-4 and 10a-13, the grip device includes at least one aperture 48 sized to grip at least a portion of an outer surface of the cable 24. The aperture 48 of the grip device may be completely closed, such as a through hole, or partially enclosed, such as a slotted opening, channel, or the like, to give non-limiting examples of grip device apertures. The grip device 14 of FIGS. 1-4 and 10a-13 comprises a grip washer, wherein the grip washer further comprises at least one prong 50 for engaging the at least a portion of an outer surface of the cable 24. The grip washer of the cable attachment 10 of FIGS. 1-10 is configured to automatically grip the outer surface of the cable 24, such that the grip device 14 does not require a compressive, or other, force from the other portions of the cable attachment in order to grip the cable. Further embodiments of the cable attachment of the present invention comprise grip devices that may or may not automatically grip the cable. As shown in FIGS. 1-4 and 10a-13, the grip device 14 includes a plurality of generally radial slits extending from the aperture 48 a certain distance toward the perimeter of the grip device. The prongs 50 of the grip device 14 are defined between the generally radial slits. The prongs 50 also include an angled portion 52, such that a radially inward portion of the prongs are angled in one axial direction. Therefore, the angled portions 52 of the prongs 50 provide for easy insertion of a cable 24 through the aperture 48; however, the angled portions of the prongs grip at least a portion of an outer surface of the cable to prevent the cable from being removed from the grip device in an opposite direction from which it was inserted. For the embodiment of the present invention illustrated in FIGS. 1-4 and 10a-13, the grip device 14 is sized to allow insertion of the cable 24 through the aperture 48 with one to five pounds of force in an axial direction; however, removal of the cable from the aperture of the grip device requires approximately fifty pounds or more of force in an opposite axial direction. Therefore, the grip device 14 retains the cable 24 inserted into the cable attachment and provides strain relief such that once the cable has been properly installed in the cable attachment and the one or more fibers connected within the closure, an axial force exerted on the cable external to the closure will be distributed through the cable attachment to minimize and/or prevent damage to the one or more fiber connections within the closure. Further embodiments of the present invention provide alternative designs for the grip washer illustrated in FIGS. 1-4 and 10a-13, while still further embodiments provide alternative grip devices, such as the grip devices of FIGS. 15a-18d, to provide a number of non-limiting examples.

Some embodiments of the cable attachment and closure of the present invention are configured to be used with grounded cables. The cable inserted into the cable attachment and closure may comprise a metallic armor, a metallic strength member, or other component that defines a ground. The cable attachment is configured to pierce the jacket of the cable such that an electrically conductable portion of the cable attachment electrically engages the armor or strength member of the cable to thereby ground the cable attachment. Furthermore, the cable attachment of some embodiments of the present invention comprise electrically conductable leads that electrically join the cable ground to the closure to thereby ground the closure. One non-limiting example of a grounded cable attachment comprises a grip device that pierces the jacket a sufficient amount to electrically contact the armor and/or strength member to thereby ground the grip device. The grounded grip device is further connected to an electrical conductor, such as a conductor extending radially through the adapter body to provide one non-limiting example, that is in electrical communication with at least part of the closure. Still further embodiments of the present invention comprise alternative devices and configurations to ground the cable attachment and closure when grounded cables are provided.

The grip device 14 of FIGS. 1-4 and 10a-13 is configured to be inserted into the opening 34 of the adapter body 12, and is inserted with the prongs 52 angled toward the first axial end 30 of the adapter body 12 for the embodiment of FIGS. 1-8 (to insert the grip device with the prongs in the opposite direction would prevent the cable from passing through, and being engaged by, the grip device); however, further embodiments may orient the grip device in an alternative direction. Opposite the first axial end 30 of the grip device 14 is provided a grommet device 16 within the opening of the adapter body proximate the grip device. The grommet device 16 of FIGS. 1-8 defines a generally cylindrical shape with a passageway therethrough to allow the cable to traverse the grommet device in a generally axial direction. As used herein, "traverse" means that the cable passes through and/or around the grommet device.

The grommet device 16 of FIGS. 1-8 comprises an elastomeric material, examples include but are not limited to silicone materials, neoprene materials, and ethylene propylene diene monomer (EPDM), that is easily deformable relative to the thermoplastic material of the adapter body and bolt portion and to the metal of the grip device 14; however, further embodiments of the cable attachment provide grommet devices of alternative material. The grommet device 16 is intended to change shape when exposed to forces, such as compressive forces in the illustrated embodiment. For the grommet device 16 of FIGS. 1-8, as axially compressive forces are exerted upon the grommet device as the bolt portion 20 is threaded into the adapter body 12, the diameter of the passageway 54 is reduced such that the grommet device engages the outer surface of the cable 24. The cable attachment 10 of FIGS. 1-8 is preferably configured to provide a sealing engagement of the grommet device 16 about the outer surface of the cable 24, such that water, moisture, dirt, infestation, and/or other undesirable material are not able to enter the closure through the cable attachment. Additional embodiments of the present invention provide alternative grommet devices of different shapes, materials, and/or sizes such that one or more forces exerted upon the grommet device enables the grommet device to partially or completely provide a seal about an outer surface of a cable.

The grommet device of various embodiments of the present invention comprises one or more keyed portions along an exterior wall of the grommet that engages the opening of the adapter body. The opening of the adapter body also includes one or more keyed slots adapted to receive the keyed portions, such that the grommet device can be rotationally retained within the adapter body. Furthermore, the grommet device of such embodiments of the cable attachment includes a passageway that defines a cross-section, such as elliptical to provide one non-limiting example, that is adapted to receive a cable that defines a corresponding cross-section. Because the grommet is rotationally fixed relative to the adapter body and the adapter body is rotationally fixed relative to the closure in some embodiments of the invention (see discussion of FIGS. 9a and 9b below), cables having non-circular cross-sections can be inserted into the cable attachments in a preferred orientation such that the portions of the one or more cables exterior to the closure can be conveniently routed in a desired direction to minimize damage to the fibers or minimize stresses created on the cable when bending. Further embodiments of the present invention comprise alternative features and configurations to provide convenient routing of the cables exterior to the closure.

The washer 18 is provided in the embodiment of FIGS. 1-8 to provide protection for the grommet device 16 from wear on the axial surface that engages the bolt portion 20. Additional embodiments of the present invention provide alternative devices to protect the grommet device and/or provide grommet devices that do not need protection. Further embodiments of the present invention may provide on the bolt portion a surface of a particular shape, material, or texture for minimizing damage to the grommet device. Still further embodiments of the present embodiment may omit the washer and other components for protection of the grommet device.

The bolt portion 20 of the cable attachment 10 of FIGS. 1-4 comprises a unitary component made of thermoplastic material, preferably the same material as used in the adapter body 12; however, further embodiments of the present invention may be made of alternative materials such as metal to list an additional non-limiting example. Although the bolt portion 20 of FIGS. 1-4 is generally shaped similar to a conventional bolt, bolt portions of further embodiments of the present invention comprise shapes and features that do not necessarily resemble a bolt portion. The bolt portion of the present invention is any component that is selectively moveable, relative to the adapter body, to provide a force on the grommet device regardless of shape, size, location or orientation of the cable relative to the bolt portion, or any other feature of the bolt portion. Turning again to the bolt portion 20 of FIGS. 1-4, the bolt portion comprises a through hole that defines an axis that is generally aligned with an axis of the grommet device; however further embodiments of the bolt portion comprise through holes of any shape and orientation or no through hole at all. In addition, the bolt portion 20 is configured to engage the adapter body 12, such as by threading the bolt portion into the opening 34 of the adapter body to describe one non-limiting example of engagement between the bolt portion and adapter body. The bolt portion 20 preferably has a collar 56 at an axial end of the threaded exterior portion 46, which preferably limits the distance that the bolt portion may be threaded into the adapter body 12. Further embodiments of the cable attachment of the present invention comprise bolt portions with removable washers or other devices for selectively adjusting the amount of travel the bolt portion may make relative to the adapter body.

Returning again to the bolt portion 20 of the cable attachment 10 of FIGS. 1-4, by threading the bolt portion into the opening 34 of the adapter body 12, the bolt portion selectively applies a force upon the grommet device 16 (through the washer 18) such that the grommet device engages the outer surface of the cable 24. The bolt portion 20 of FIGS. 1-4 applies a compressive force upon the grommet device 16 to cause the inner diameter of the grommet device to decrease and create a seal about the outer surface of the cable; however, further embodiments of the present invention provide alternative bolt portions that define alternative engagements with the adapter body to provide different forces upon the grommet device in order to cause the grommet device to engage the outer surface of the cable.

To install the cable attachment 10 of FIGS. 1-8, if the cable attachment is not already positioned within the opening of the closure, the technician preferably accesses the closure to remove any component that may be occupying or obstructing the opening of the closure, such as a grommet. The technician axially inserts the adapter body (which may or may not be attached to the other portions of the cable attachment) from outside the closure until the collar portion engages the exterior wall of the closure proximate the opening. The technician then threads on the retention device (not shown) on the interior portion of the adapter body until the adapter body is axially secured in the opening of the closure. If the cable attachment includes the grip device, grommet device, and bolt portion when installed in the closure, the technician rotates the bolt portion away from the adapter body such that the passageway of the grommet device is opened sufficiently for a cable to pass therethrough. If a plug 22 is provided in the cable attachment 10, it may be removed from the cable attachment once the passageway has been sufficiently opened, and the plug may be discarded or saved for subsequent use. The technician then feeds the cable 24 through the cable assembly 10, such as is shown in FIGS. 3 and 4 until the cable defines the desired axial position, e.g., the amount of cable fed into the closure is a sufficient amount to enable the technician to perform the necessary fiber optic joining operation, such as splicing and/or connectorizing. Alternatively, if only the adapter body is installed in the closure, the technician may feed the cable axially through the bolt portion, the washer 18 (if desired), the grommet device 16, the grip device 14, and then through the adapter body and then insert the grip device, grommet device, washer, and bolt portion in the opening of the adapter body and then thread the bolt portion into the adapter body to define the assembled cable attachment. Further embodiments of the present invention comprise alternative and/or additional procedures for installing the cable attachment in the closure and/or passing the cable through the cable attachment.

As mentioned earlier, the cable attachment 10 may be used with cables 24 that that include a jacket 26 (and other components such as strength members to list one example) about one or more buffer tubes 28, such that the jacket may be selectively stripped from the buffer tube at a desired axial position, such as is illustrated in FIG. 3. Alternative embodiments of the present invention include cable attachments for use with non-stripped cables. However, the cable attachment 10 of the embodiment illustrated in FIGS. 1-8 is configured to accept stripped cables 24 as the opening of the first axial end 30 of the adapter body 12 is sized to allow passage of only the buffer tube 28 of the cable. Because the technician will be inserting a stripped cable 24, the technician should ensure that the grip device 14 has gripped at least a portion of the outer surface of the jacket 26 of the cable, as the buffer tube 28 defines a diameter too small to be gripped by the prongs 50 of the grip device. In order for the technician to be able to visually verify that the cable 24 has been axially inserted into the cable attachment 10 a sufficient length, one or more windows 60 are provided within the first axial end 30, such that a portion of the at least one opening of the adapter body is visible from a generally radial direction relative to an axis of the at least one opening of the adapter body. More specifically, the windows 60 are located between the opening of the first axial end 30 of the adapter body 12 and the fully installed grip device 14 so that the technician may be able to see that the jacket 26 of the cable 24 has passed through the grip device such that the cable is adequately retained and/or strain relieved by the cable attachment. FIG. 5 illustrates an installed cable in which only the buffer tube 28 is visible through the window 60, thus indicating to the technician that the cable 24 should be inserted axially further into the cable attachment as the grip device 14 may not be engaging the outer surface of the cable. FIG. 6 illustrates a properly installed cable 24 in which the technician can verify that the jacket 26 has passed through the grip device 14 a sufficient axial length to provide the desired retention and/or strain relief. Further embodiments of the present invention provide alternative devices and/or features to enable a technician to ensure that the cable is properly installed in the cable attachment.

Turning now to the adapter body 12 of FIGS. 7 and 8, the adapter body 12 includes a tab portion 62 defined on an exterior surface of the adapter body, such that the tab portion rotationally fixes the adapter body relative to the closure, which is particularly helpful when the technician is threading the retention device (not shown) to axially secure the adapter body to the closure, as shown if FIGS. 9a and 9b, and when the technician is rotating the bolt portion 20 relative to the adapter body to selectively apply and remove forces on the grommet device 16. The tab portion 62 of the illustrated embodiment comprises slot into which a protrusion on the closure engages to prevent rotation of the adapter body relative to the closure. Alternative embodiments of the present invention comprise alternative tab portions configured to rotationally fix the adapter body relative to the closure.

Two closures 64 of slightly different designs are illustrated in FIGS. 9a and 9b, wherein each closure has eight openings that have cable attachments 10 positioned adjacent thereto, or more specifically, positioned within the openings. The cable attachments 10 are illustrated without cables 24 or plugs 22 inserted therein. The cable attachments of FIGS. 9a and 9b are fully installed such that the tab portion 62 of each adapter body 12 engages a protrusion 66 of the closure 64, such that each adapter body is rotationally fixed relative to the closure. Further embodiments of the present invention comprise closures having at least one opening and/or defining alternative protrusions configured to rotationally fix adapter bodies installed proximate thereto.

Turning now to FIGS. 10a-13 the grip device 14 is shown from a number of vantage points to illustrate the grip provided by the prongs 50 of the grip device. As the jacket 26 of the cable 24 defines an elliptical cross-section, only four of the eight prongs 50 of the grip device 14 grip the outer surface of the cable; however, enough grip is provided by the four prongs of the grip device to provide the desired retention and/or strain relief for the embodiment shown in FIGS. 1-13. Further embodiments of the present invention comprise alternative grip devices adapted for specific cable cross-sections and/or alternative designs for gripping the cable.

Additional embodiments of the present invention are provided in FIGS. 14a-18d, wherein alternative cable attachments 110-510 are illustrated. The cable attachment 110 of FIGS. 14a-14d includes a jacket piercing grip device 114, which may also be known as an insulation displacement contact ("IDC"). The grommet device 116, which may or may not provide a sealing engagement with the outer surface of the cable, is axially positioned along the cable 124. The grommet device 116 of the embodiment of FIGS. 14a-14d is a retainer insert and does not provide a sealing engagement with the outer surface of the cable 124; however, a seal is provided by the cable attachment 110 with a heat shrink portion, as discussed below. One or more jacket piercing grip devices 114 are inserted into one or more generally radially oriented slots until the grip devices pierce the jacket of the cable 124 and preferably engage the strength members of the cable to improve the retention and/or strain relief of the cable attachment 110. The technician may need to use pliers or other equipment to fully engage the grip device 114 with the cable 124 to grip the cable. A bolt portion 120, which comprises a retainer body in the embodiment of FIGS. 14a-14d, is then axially advanced to generally enclose the grommet device 116. The bolt portion 120 of FIGS. 14a-14d preferably includes a heat shrink portion that may be shrunk once the bolt portion is in position to provide a seal for the cable attachment 110. The cable attachment 110 of FIG. 14c may then be inserted into the adapter body 112 which is preferably positioned adjacent the opening of the closure. The bolt portion 120 may include a threaded portion to engage the adapter body or other features to selectively engage the adapter body. One non-limiting example of features for selective engagement of the bolt portion and adapter body includes a bolt portion and adapter body configured to replicate the OPTI-TAP™ connectors available from Corning Cable Systems LLC of Hickory, N.C.

Turning now to the cable attachment 210 of FIGS. 15a-15d, the cable attachment 210 is comparable to the cable attachment 110 of FIGS. 14a-14d but with the addition of an extra set of jacket piercing grip devices 214. Similarly, the cable attachment 310 of FIGS. 16a-16d is similar to the cable attachment 110 of FIGS. 14a-14d but the cable attachment 310 includes the jacket piercing grip devices 314 that define a U-shaped design such that a single grip device 314 is capable of gripping the outer surface of the cable in at least two locations. The cable attachment 410 of FIGS. 17a-17d is also similar to the cable attachment 110 of FIGS. 14a-14d; however the grip device 414 comprises a single set screw that is threaded into the grommet device 416 to grip the outer surface of the cable 424. Likewise, the cable attachment 510 of FIGS. 18a-18d comprises a grip device 514 of two set screws for gripping the outer surface of the cable 524. Still further embodiments of the present invention comprise alternative grip devices and other components of the cable attachment and closure.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A cable attachment for sealing and retaining a cable entering a telecommunications closure through an opening defined in the closure, the cable attachment comprising:
    an adapter body configured for positioning adjacent the opening of the closure, wherein the adapter body provides at least one opening sized to allow passage of at least one cable;
    a grip device provided within the at least one opening of the adapter body, wherein the grip device defines an aperture sized to grip at least a portion of an outer surface of the cable, and wherein the grip device does not require a force from other portions of the cable attachment to grip the at least a portion of an outer surface of the cable,
    a grommet device provided within the at least one opening of the adapter body and proximate the grip device, wherein the grommet device defines a passageway to allow the cable to traverse the grommet device in a generally axial direction relative to the cable; and
    a bolt portion configured to engage the adapter body, wherein the bolt portion is adapted to selectively apply a force upon the grommet device such that the grommet device engages the outer surface of the cable.

2. A cable attachment according to claim 1, wherein the at least one opening of the adapter body is sized to allow passage of at least one fiber optic cable.

3. A cable attachment according to claim 1, wherein the adapter body defines a first axial end and a second axial end generally opposed to the first axial end, and wherein the first axial end comprises at least one window, such that a portion of the at least one opening of the adapter body is visible from a generally radial direction relative to an axis of the at least one opening of the adapter body.

4. A cable attachment according to claim 1, wherein the grip device comprises a grip washer.

5. A cable attachment according to claim 1, wherein the grip device comprises at least one set screw.

6. A cable attachment according to claim 1, wherein the grip device comprises at least one prong for engaging at least a portion of the outer surface of the cable.

7. A cable attachment according to claim 1, wherein passageway of the grommet device comprises a through hole defining an axis that is generally aligned with an axis of the adapter body.

8. A cable attachment according to claim 1, wherein the passageway of the grommet device defines a non-circular cross-section, and wherein the grommet device comprises a keyed portion such that the grommet device may be selectively oriented relative to the adapter body.

9. A cable attachment according to claim 1, further comprising a plug that is selectively retained by at least the grommet device to seal the cable attachment prior to entry of the cable into the closure.

10. A cable attachment according to claim 1, wherein the adapter body includes at least one tab portion defined on an exterior surface of the adapter body such that the tab portion rotationally fixes the adapter body relative to the closure.

11. A cable attachment according to claim 1, wherein the adapter body defines a threaded interior portion and the bolt portion defines a threaded exterior portion such that the bolt portion can be selectively threaded into the adapter body.

12. A cable attachment according to claim 1, wherein the adapter body defines an interior portion at a first axial end and an exterior portion at a second axial end generally opposed to the first axial end, wherein the adapter body is configured to pass through the opening of the closure and to be retained by the closure such that the interior portion of the adapter body is located inside the closure and the exterior portion of the adapter body is located outside the closure.

13. A cable attachment according to claim 12, wherein the at least one opening of the adapter body defines a smaller cross-sectional area at the first axial end relative to the cross-sectional area of the at least one opening at the second axial end.

14. A telecommunications device comprising:
    a closure defining at least one opening;
    a cable attachment comprising:
        an adapter body configured for positioning adjacent the opening of the closure, wherein the adapter body provides at least one opening sized to allow passage of at least one cable;
        a grip device provided within the at least one opening of the adapter body, wherein the grip device defines an aperture sized to grip at least a portion of an outer surface of the cable, and wherein the grip device does not require a force from other portions of the cable attachment to grip the at least a portion of an outer surface of the cable;
        a grommet device provided within the at least one opening of the adapter body and proximate the grip device, wherein the grommet device defines a passageway to allow the cable to traverse the grommet device in a generally axial direction relative to the cable; and a bolt portion configured to engage the adapter body, wherein the bolt portion is adapted to selectively apply a force upon the grommet device such that the grommet device engages the outer surface of the cable;

wherein the cable attachment is adapted to seal and retain a cable entering the closure through the at least one opening defined in the closure.

15. A telecommunications device according to claim 14, wherein the grip device comprises a grip washer.

16. A telecommunications device according to claim 14, further comprising a plug that is selectively retained by at least the grommet device to seal the cable attachment prior to entry of the cable into the closure.

17. A telecommunications device according to claim 14, wherein the adapter body defines a threaded interior portion and the bolt portion defines a threaded exterior portion such that the bolt portion can be selectively threaded into the adapter body.

* * * * *